US011546905B1

(12) United States Patent
Skarda et al.

(10) Patent No.: US 11,546,905 B1
(45) Date of Patent: Jan. 3, 2023

(54) WIFI ROUTERS AND SWITCHING

(71) Applicant: Vivint, Inc., Provo, UT (US)

(72) Inventors: Brian Vencil Skarda, South Jordan, UT (US); Christopher Lee Harris, Holladay, UT (US)

(73) Assignee: VIVINT, INC., Provo, UT (US)

( * ) Notice: Subject to any disclaimer, the term of this patent is extended or adjusted under 35 U.S.C. 154(b) by 92 days.

(21) Appl. No.: 17/214,714

(22) Filed: Mar. 26, 2021

(51) Int. Cl.
*H04W 88/06* (2009.01)
*H04W 72/04* (2009.01)
*H04W 74/08* (2009.01)
*H04W 72/08* (2009.01)

(52) U.S. Cl.
CPC ..... *H04W 72/0453* (2013.01); *H04W 72/085* (2013.01); *H04W 74/0833* (2013.01); *H04W 88/06* (2013.01)

(58) Field of Classification Search
CPC ........... H04W 72/0453; H04W 72/085; H04W 74/0833; H04W 88/06
See application file for complete search history.

(56) References Cited

U.S. PATENT DOCUMENTS

| | | | | |
|---|---|---|---|---|
| 9,083,087 | B2* | 7/2015 | Shan | H01Q 1/48 |
| 9,362,619 | B2* | 6/2016 | Montgomery | H01Q 9/28 |
| 9,608,749 | B2* | 3/2017 | Mueller | H04B 1/0057 |
| 10,567,029 | B2* | 2/2020 | Bai | H04B 7/0404 |
| 10,840,952 | B2* | 11/2020 | Dai | H04B 1/006 |
| 11,336,312 | B2* | 5/2022 | Takeuchi | H04B 1/006 |
| 11,411,596 | B1* | 8/2022 | Lin | H04B 1/006 |
| 11,417,230 | B1* | 8/2022 | Hall | G09B 5/08 |

* cited by examiner

*Primary Examiner* — Julio R Perez
(74) *Attorney, Agent, or Firm* — Kunzler Bean & Adamson

(57) ABSTRACT

Methods, systems, and devices for Wi-Fi routers and switching are described. An apparatus for wireless communication in a Wi-Fi network may include a set of radio frequency (RF) switches, where a first RF switch provides a connection for a set of RF signal paths to a processor of the apparatus and a second RF switch provides a connection for the set of RF signal paths to an antenna of the apparatus. The set of RF signal paths may include a combination of one or more highpass signal paths, lowpass signal paths, bandpass signal paths, or passthrough signal paths. The apparatus may determine a set of Wi-Fi channels for the wireless communication with one or more wireless devices of the Wi-Fi network, select at least one RF signal path to pass at least one Wi-Fi channel, and process the wireless communication using the at least one RF signal path.

20 Claims, 10 Drawing Sheets

WIFI ROUTERS AND SWITCHING

FIELD OF TECHNOLOGY

The present disclosure, for example, relates to security, automation, and home automation systems, and more particularly to Wi-Fi routers and switching.

BACKGROUND

Wired and wireless networking and communication systems are widely deployed to provide various types of communication and functional features, including but not limited to those for security, automation, and home automation systems, such as monitoring, communication, notification, among other examples. These systems may be capable of supporting communication with a user through a communication connection or a system management action. Some security, automation, and home automation systems may include multiple devices communicating over wireless communication links. However, in some cases, wireless communications between some devices may cause interference at wireless communications between other devices, thereby reducing a reliability and a quality of the wireless communications. The reduced reliability and quality of wireless communications may decrease performance and reliability of the security, automation, and home automation system. For example, signals (e.g., video signals, audio signals) received from sensors (e.g., camera devices) of the security, automation, and home automation system may suffer reduced reliability, quality, or loss of reception due to interference caused by other wireless communications, thereby reducing the information gathered by and available to the security, automation, and home automation system (e.g., users of the security, automation, and home automation system).

SUMMARY

The described techniques relate to improved methods, systems, devices, and apparatuses that support techniques for Wi-Fi routers. Generally, the described techniques provide for reducing interference in a Wi-Fi network and improving wireless communication reliability and quality by using a switchable set of filters included in a Wi-Fi device of the Wi-Fi network. For example, a security, automation, and home automation system may include an apparatus (e.g., a Wi-Fi device) for wirelessly communicating with wireless devices (e.g., sensor devices, camera-enable devices, or other wireless devices) over the Wi-Fi network. The apparatus may include a processor (e.g., and one or more Wi-Fi radio chips) to facilitate communications over the Wi-Fi network. Additionally, the apparatus may include a set of radio frequency (RF) switches, where a first RF switch provides a first connection for a set of RF signal paths to the processor and a second RF switch provides a connection for the set of RF signal paths to an antenna of the apparatus.

The set of RF signal paths may include any combination of one or more highpass signal paths, lowpass signal paths, bandpass signal paths, or passthrough signal paths that may be selected by the apparatus for processing wireless communications in the Wi-Fi network. Each RF signal path may include one or more filters (e.g., highpass filters, lowpass filters, bandpass filters, passthrough filters). The apparatus may determine a set of Wi-Fi channels for the wireless communication with wireless devices of the Wi-Fi network (e.g., based on scanning the set of Wi-Fi channels to determine associated channel qualities, based on a user entered setting) and may select at least one RF signal path of the set of RF signal paths to pass at least one Wi-Fi channel of the set of Wi-Fi channels. The apparatus may process the wireless communication using the at least one RF signal path. For example, the apparatus may set the first RF switch and the second RF switch to route the wireless communication through the at least one RF signal path.

A method for wireless communication at an apparatus in a Wi-Fi network is described. The method may include determining a set of Wi-Fi channels for the wireless communication with one or more wireless devices in the Wi-Fi network, where the apparatus includes a processor and a set of RF switches, a first RF switch of the set of RF switches providing a first connection for a set of RF signal paths to the processor, a second RF switch of the set of RF switches providing a second connection for the set of RF signal paths to an antenna of the apparatus, selecting at least one RF signal path from the set of RF signal paths to pass at least one Wi-Fi channel of the set of Wi-Fi channels, where the set of RF signal paths includes one or more highpass signal paths, lowpass signal paths, bandpass signal paths, or passthrough signal paths, or any combination thereof, and processing the wireless communication in the Wi-Fi network based on passing the at least one Wi-Fi channel of the set of Wi-Fi channels using the at least one RF signal path from the set of RF signal paths.

An apparatus for wireless communication at an apparatus in a Wi-Fi network is described. The apparatus may include a processor, memory coupled with the processor, and instructions stored in the memory. The instructions may be executable by the processor to cause the apparatus to determine a set of Wi-Fi channels for the wireless communication with one or more wireless devices in the Wi-Fi network, where the apparatus includes a processor and a set of RF switches, a first RF switch of the set of RF switches providing a first connection for a set of RF signal paths to the processor, a second RF switch of the set of RF switches providing a second connection for the set of RF signal paths to an antenna of the apparatus, select at least one RF signal path from the set of RF signal paths to pass at least one Wi-Fi channel of the set of Wi-Fi channels, where the set of RF signal paths includes one or more highpass signal paths, lowpass signal paths, bandpass signal paths, or passthrough signal paths, or any combination thereof, and process the wireless communication in the Wi-Fi network based on passing the at least one Wi-Fi channel of the set of Wi-Fi channels using the at least one RF signal path from the set of RF signal paths.

Another apparatus for wireless communication at an apparatus in a Wi-Fi network is described. The apparatus may include means for determining a set of Wi-Fi channels for the wireless communication with one or more wireless devices in the Wi-Fi network, where the apparatus includes a processor and a set of RF switches, a first RF switch of the set of RF switches providing a first connection for a set of RF signal paths to the processor, a second RF switch of the set of RF switches providing a second connection for the set of RF signal paths to an antenna of the apparatus, means for selecting at least one RF signal path from the set of RF signal paths to pass at least one Wi-Fi channel of the set of Wi-Fi channels, where the set of RF signal paths includes one or more highpass signal paths, lowpass signal paths, bandpass signal paths, or passthrough signal paths, or any combination thereof, and means for processing the wireless communication in the Wi-Fi network based on passing the at least one Wi-Fi channel of the set of Wi-Fi channels using the at least one RF signal path from the set of RF signal paths.

A non-transitory computer-readable medium storing code for wireless communication at an apparatus in a Wi-Fi network is described. The code may include instructions executable by a processor to determine a set of Wi-Fi channels for the wireless communication with one or more wireless devices in the Wi-Fi network, where the apparatus includes a processor and a set of RF switches, a first RF switch of the set of RF switches providing a first connection for a set of RF signal paths to the processor, a second RF switch of the set of RF switches providing a second connection for the set of RF signal paths to an antenna of the apparatus, select at least one RF signal path from the set of RF signal paths to pass at least one Wi-Fi channel of the set of Wi-Fi channels, where the set of RF signal paths includes one or more highpass signal paths, lowpass signal paths, bandpass signal paths, or passthrough signal paths, or any combination thereof, and process the wireless communication in the Wi-Fi network based on passing the at least one Wi-Fi channel of the set of Wi-Fi channels using the at least one RF signal path from the set of RF signal paths.

In some examples of the method, apparatuses, and non-transitory computer-readable medium described herein, processing the wireless communication may include operations, features, means, or instructions for receiving the wireless communication from the one or more wireless devices and filter the wireless communication using a filter included in the at least one RF signal path.

Some examples of the method, apparatuses, and non-transitory computer-readable medium described herein may further include operations, features, means, or instructions for scanning the set of Wi-Fi channels to determine a channel quality associated with each Wi-Fi channel of the set of Wi-Fi channels, where the instructions to select the at least one RF signal path may be further executable by the processor based on the scan.

In some examples of the method, apparatuses, and non-transitory computer-readable medium described herein, selecting the at least one RF signal path may include operations, features, means, or instructions for selecting the at least one RF signal path based on a user setting to select the at least one RF signal path.

Some examples of the method, apparatuses, and non-transitory computer-readable medium described herein may further include operations, features, means, or instructions for setting the first RF switch to provide the first connection for the at least one RF signal path based on the selection of the at least one RF signal path and setting the second RF switch to provide the second connection for the at least one RF signal path based on the selection of the at least one RF signal path.

Some examples of the method, apparatuses, and non-transitory computer-readable medium described herein may further include operations, features, means, or instructions for selecting, based on a trigger, a second RF signal path from the set of RF signal paths to pass a second Wi-Fi channel of the set of Wi-Fi channels and processing a second wireless communication in the Wi-Fi network based on passing the second Wi-Fi channel of the set of Wi-Fi channels using the second RF signal path from the set of RF signal paths.

Some examples of the method, apparatuses, and non-transitory computer-readable medium described herein may further include operations, features, means, or instructions for detecting that a channel quality associated with the at least one Wi-Fi channel satisfies a threshold, where the trigger corresponds to the channel quality associated with the at least one Wi-Fi channel satisfying the threshold.

Some examples of the method, apparatuses, and non-transitory computer-readable medium described herein may further include operations, features, means, or instructions for enabling a timer based on the channel quality associated with the at least one W-Fi channel satisfying the threshold, where the trigger corresponds to the timer lapsing.

Some examples of the method, apparatuses, and non-transitory computer-readable medium described herein may further include operations, features, means, or instructions for scanning the set of Wi-Fi channels to determine a respective channel quality associated with each Wi-Fi channel of the set of Wi-Fi channels, where the threshold may be based on the respective channel qualities.

Some examples of the method, apparatuses, and non-transitory computer-readable medium described herein may further include operations, features, means, or instructions for determining a reset condition of the apparatus, where the trigger corresponds to the reset condition.

In some examples of the method, apparatuses, and non-transitory computer-readable medium described herein, the set of RF signal paths includes a set of filters, each filter of the set of filters corresponding to a RF signal path of the set of RF signal paths.

In some examples of the method, apparatuses, and non-transitory computer-readable medium described herein, the apparatus includes one or more Wi-Fi radio chips coupled with the processor.

In some examples of the method, apparatuses, and non-transitory computer-readable medium described herein, the set of Wi-Fi channels corresponds to a first RF spectrum band, each Wi-Fi channel corresponding to a RF spectrum subband of the first RF spectrum band.

In some examples of the method, apparatuses, and non-transitory computer-readable medium described herein, the first RF spectrum band may be a 2.4 gigahertz band.

In some examples of the method, apparatuses, and non-transitory computer-readable medium described herein, the apparatus may be located within a threshold distance of a Wi-Fi device in the Wi-Fi network.

In some examples of the method, apparatuses, and non-transitory computer-readable medium described herein, the one or more wireless devices may be camera-enabled devices.

In some examples of the method, apparatuses, and non-transitory computer-readable medium described herein, the apparatus may be a Wi-Fi device associated with one or more of an automation system, a security system, or a home automation system.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label

DETAILED DESCRIPTION

Figure 1:
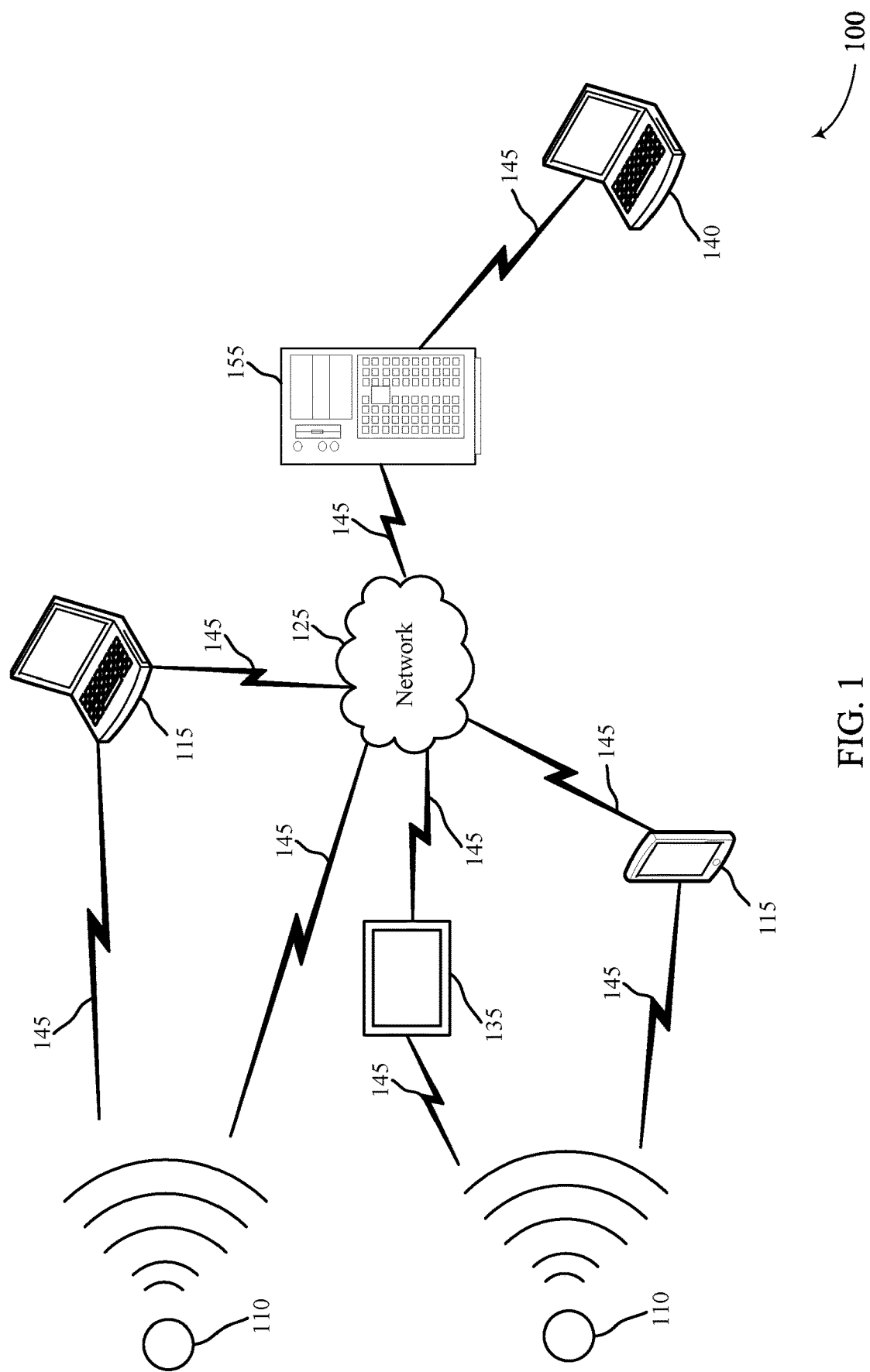
FIGS. 1 and 2 illustrate examples of systems that support Wi-Fi routers and switching in accordance with aspects of the present disclosure.

Security and automation systems are used in a variety of premises, such as for homes and commercial businesses, and have become commonplace as people automate various aspects of their lives and protect themselves and their property, among other reasons. As used herein, the term "premises" or "home" may generically refer to any dwelling or property that is monitored by a monitoring system such as an automation system and a security system. Additionally, the term "security and automation system" may be used herein to describe a security system, an automation system, a home automation system, or a smart home security and automation system, which may provide automation and security functionality.

Some security and automation systems may include wireless devices that may wirelessly communicate over a Wi-Fi network. In some examples, a security and automation system may include an apparatus, such as a Wi-Fi device or a Wi-Fi router that facilitates communications between the wireless devices and between the wireless devices and various control components (e.g., a control system, a control panel) of the security and automation system. For example, the apparatus may include a processor and one or more Wi-Fi radio chips used to communicate with the wireless devices over various Wi-Fi channels of a radio frequency (RF) spectrum band (e.g., a 2.4 gigahertz (GHz) band, a 5 GHz band, or some other RF spectrum band).

In some cases, wireless communications over the Wi-Fi network may interfere with other wireless communications over the Wi-Fi network. For example, wireless communications received at the apparatus from a first wireless device may interfere with wireless communications received at the apparatus from a second wireless device.

Additionally, or alternatively, the apparatus may be located relatively close to a Wi-Fi device (e.g., a Wi-Fi router) of the premises that facilitates wireless communications between user devices or other wireless devices located at the premises but that are unassociated with the security and automation system. Due to the close proximity to the Wi-Fi device, in some cases, wireless communications transmitted and received at the Wi-Fi device may interfere with wireless communications received at the apparatus. As a result, signals (e.g., video signals, audio signals, or other signals) received from wireless devices (e.g., camera-enabled devices, sensors) of the security and automation system may suffer reduced reliability, quality, or loss of reception, thereby reducing the performance of and information available to the security and automation system (e.g., users of the security and automation system).

Techniques, systems, apparatuses, and devices are described herein for reducing interference in a Wi-Fi network and improving wireless communication reliability and quality by using a switchable set of filters included in a Wi-Fi device of the Wi-Fi network. For example, the apparatus (e.g., the Wi-Fi device, the Wi-Fi router) of the security and automation system may include a set of RF switches that includes at least a first RF switch and a second RF switch. The first RF switch may provide a first connection for a set of RF signal paths to the processor, and the second RF switch may provide a connection for the set of RF signal paths to an antenna of the apparatus. The set of RF signal paths may include any combination of one or more highpass signal paths, lowpass signal paths, bandpass signal paths, or passthrough signal paths that may be selected by the apparatus for processing wireless communications in the Wi-Fi network. Each RF signal path may include one or more filters (e.g., highpass filters, lowpass filters, bandpass filters, passthrough filters).

The apparatus may determine a set of Wi-Fi channels for the wireless communication with one or more wireless devices of the Wi-Fi network (e.g., based on scanning the set of Wi-Fi channels to determine associated channel qualities, based on a user entered setting) and may select at least one RF signal path of the set of RF signal paths to pass at least one Wi-Fi channel of the set of Wi-Fi channels. The apparatus may process the wireless communication using the at least one RF signal path. For example, the apparatus may set the first RF switch and the second RF switch to route the wireless communication through the at least one RF signal path. Therefore, processing wireless communications using selected RF signal paths may increase reliability, signal quality, and throughput. Additionally or alternatively, processing wireless communications using selected RF signal paths may provide improvements to latency, power consumption, resource usage, and spectral efficiency, among other benefits.

Aspects of the disclosure are initially described in the context of systems. Aspects of the disclosure are further illustrated by and described with reference to an apparatus. Aspects of the disclosure are further illustrated by and described with reference to apparatus diagrams, system diagrams, and flowcharts that relate to Wi-Fi routers and switching.

FIG. 1 illustrates an example of a system 100 in accordance with various aspects of the disclosure. In some examples, the system 100 may be an example of an automation system, a security system, or a home automation system. The system 100 may include one or more sensor devices 110, local computing devices 115, a network 125, a server 155, a control panel 135, and a remote computing device 140. One or more sensor devices 110 may communicate via wired or wireless communication links 145 with one or more of the local computing devices 115 or the network 125. The network 125 may communicate via wired or wireless communication links 145 with the control panel 135 and the remote computing device 140 via the server 155. In some aspects, the network 125 may be integrated with any one of the local computing devices 115, the server 155, or the remote computing device 140, such that separate components are not required.

The local computing devices 115 and the remote computing device 140 may be custom computing entities configured to interact with the sensor devices 110 via the network 125, and in some aspects, via the server 155. In some examples, the local computing devices 115 and the remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smartphone, a smart display, a mobile phone, a personal digital assistant (PDA), and any other suitable device operable to send and receive signals, store and retrieve data, and execute modules.

The control panel 135 may be a display panel of a smart home automation system, for example, an interactive display panel mounted on at a location (e.g., a wall) in a smart home. The control panel 135 may receive data via the sensor devices 110, the local computing devices 115, the remote computing device 140, the server 155, and the network 125. The control panel 135 may be in direct communication with the sensor devices 110 (e.g., via wired or wireless communication links 145) or in indirect communication with the sensor devices 110 (e.g., via the local computing devices 115 or the network 125). The control panel 135 may be in direct communication with the local computing devices 115 (e.g., via wired or wireless communication links 145, such as via Bluetooth® communications) or in indirect communication with the local computing devices 115 (e.g., via the network 125). The control panel 135 may be in indirect communication with the server 155 and the remote computing device 140 (e.g., via the network 125).

In some aspects, the control panel 135 may receive sensor data (e.g., sensor information) from the sensor devices 110. The sensor devices 110 may include physical sensors such as, for example, an RF motion sensor, an infrared motion sensor (e.g., a passive infrared motion sensor), a radar motion sensor, an audio recognition sensor, an ultrasonic sensor (e.g., echolocation), a camera device, or the like. The sensor data (e.g., sensor information) may include, for example, motion information (e.g., motion detection information), multimedia information (e.g., video, audio), presence information detected by the sensor devices 110, or a combination thereof. The sensor data may include a set of data points associated with the motion information, the multimedia information, the presence information, or a combination thereof. Each sensor device 110 may be capable of providing multiple types of data. In some aspects, separate sensor devices 110 may respectively provide different types of data. For example, a sensor device 110 (e.g., an RF motion sensor) may detect motion and provide motion information, while another sensor device 110 (e.g., a camera device) (or, in some aspects, the same sensor device 110) may detect and capture audio and video signals and provide multimedia information (e.g., audio signals, video signals).

In some examples, the control panel 135 may receive discovery signals from the local computing devices 115. The discovery signals may include a Bluetooth® signal, a cellular signal, a Wi-Fi signal, a global positioning system (GPS) signal, an RF signal, a radar signal, an acoustic signal, an infrared signal, a fluid sensing signal, or the like. In some other aspects, the control panel 135 may receive sensor data as described herein from the local computing devices 115. For example, the local computing devices 115 may include or be integrated with one or more physical sensors as described herein, such as an RF motion sensor, an infrared motion sensor (e.g., a passive infrared motion sensor), a radar motion sensor, an audio recognition sensor, an ultrasonic sensor (e.g., echolocation), a camera device, or the like.

The control panel 135 and the local computing devices 115 each may include memory, a processor, an output, a data input and a communication module. The processor may be a general purpose processor, a Field Programmable Gate Array (FPGA), an Application Specific Integrated Circuit (ASIC), a Digital Signal Processor (DSP), and the like. The processor may be configured to retrieve data from and write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, or cloud storage. In some examples, the local computing devices 115 may include one or more hardware-based modules (e.g., DSP, FPGA, ASIC) and software-based modules (e.g., a module of computer code stored at the memory and executed at the processor, a set of processor-readable instructions that may be stored at the memory and executed at the processor) associated with executing an application, such as, for example, receiving, displaying, or modifying data from the sensor devices 110 (e.g., sensor data) or data from the control panel 135 (e.g., a state of the system 100, settings associated with the system 100, or the like).

The processor of the local computing devices 115 may be operable to control operation of an output (e.g., an output component) of the local computing devices 115. The output may be a television, a liquid crystal display (LCD) monitor, a cathode ray tube (CRT) monitor, speaker, or tactile output device. In some cases, the output component may be integrated with the local computing device 115. Similarly stated, the output component may be directly coupled to the processor. For example, the output component may be a display (e.g., a display component) of a tablet and smart phone. In some cases, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and any other suitable connector operable to couple the local computing device 115 to the output component.

The remote computing device 140 may be a computing entity operable to enable a remote user to monitor the output of the sensor devices 110. The remote computing device 140 may be functionally and structurally similar to the local computing devices 115 and may be operable to receive data streams from and send signals to at least one of the sensor devices 110 via the network 125. The network 125 may be the Internet, an intranet, a personal area network, a local area network (LAN), a wide area network (WAN), a virtual network, a telecommunications network implemented as a wired network and wireless network, etc. The remote computing device 140 may receive and transmit signals over the network 125 via the communication links 145 and the server 155.

In some examples, the local computing devices 115 may communicate with the remote computing device 140 or the control panel 135 via the network 125 and the server 155. Examples of the network 125 include cloud networks, LAN, WAN, virtual private networks (VPN), wireless networks (e.g., Institute of Electrical and Electronics Engineers (IEEE) 802.11 (Wi-Fi), for example), and cellular networks (e.g., using third generation (3G) systems, fourth generation (4G) systems such as Long Term Evolution (LTE) systems, LTE-Advanced (LTE-A) systems, or LTE-A Pro systems, or fifth generation (5G) systems which may be referred to as New Radio (NR) systems), etc. In some configurations, the network 125 may include the Internet. In some examples, personnel (e.g., a user) may access functions of the local computing devices 115 from the remote computing device 140. For example, in some aspects, the remote computing device 140 may include a mobile application that interfaces with one or more functions of the local computing device 115.

The server 155 may be configured to communicate with the sensor devices 110, the local computing devices 115, the remote computing device 140, and the control panel 135. The server 155 may perform additional processing on signals received from the sensor devices 110 or the local computing devices 115, or may simply forward the received information to the remote computing device 140 and the control panel 135. The server 155 may be a computing device operable to receive data streams (e.g., from the sensor devices 110 and the local computing device 115 or the remote computing device 140), store and process data, and transmit data and data summaries (e.g., to the remote computing device 140). For example, the server 155 may receive a first stream of sensor data from a first sensor device 110, a second stream of sensor data from the first sensor device 110 or a second sensor device 110, and a third stream of sensor data from the first sensor device 110 or third sensor device 110.

The server 155 may "pull" the data streams (e.g., by querying the sensor devices 110, the local computing devices 115, or the control panel 135). In some cases, the data streams may be "pushed" from the sensor devices 110 or the local computing devices 115 to the server 155. For example, a device (e.g., the sensor devices 110 or the local computing devices 115) may be configured to transmit data as the data is generated by or entered into the device. In some instances, the sensor devices 110 or the local computing devices 115 may periodically transmit data (e.g., as a block of data or as one or more data points). The server 155 may include a database (e.g., in memory) containing sensor data received from the sensor devices 110 and the local computing devices 115. Additionally, as described in further detail herein, software (e.g., stored in memory) may be executed on a processor of the server 155. Such software (executed on the processor) may be operable to cause the server 155 to monitor, process, summarize, present, and send a signal associated with resource usage data.

Wireless communications between devices of the system 100 may be facilitated by a Wi-Fi device such as a Wi-Fi router or an access point. In some examples, the Wi-Fi device may be included in the control panel 135 or the server 155. In some examples, the Wi-Fi device may be separate from the control panel 135 and the server 155. To increase the reliability and throughput and to reduce the effects of interference of wireless communications in the system 100, the Wi-Fi device may include a set of RF switches that includes at least a first RF switch and a second RF switch. The first RF switch may provide a first connection for a set of RF signal paths to a processor (e.g., or a Wi-Fi radio chip) of the Wi-Fi device, and the second RF switch may provide a connection for the set of RF signal paths to an antenna of the Wi-Fi device.

The set of RF signal paths may include any combination of one or more highpass signal paths, lowpass signal paths, bandpass signal paths, or passthrough signal paths that may be selected by the Wi-Fi device for processing wireless communications in the Wi-Fi network. The Wi-Fi device may determine a set of Wi-Fi channels for the wireless communication between the Wi-Fi device and one or more wireless devices of the Wi-Fi network (e.g., based on scanning the set of Wi-Fi channels to determine associated channel qualities, based on a user entered setting) and may select at least one RF signal path of the set of RF signal paths to pass at least one Wi-Fi channel of the set of Wi-Fi channels. The Wi-Fi device may process the wireless communication using the at least one RF signal path. For example, the Wi-Fi device may set the first RF switch and the second RF switch to route the wireless communication through the at least one RF signal path.

Figure 2:
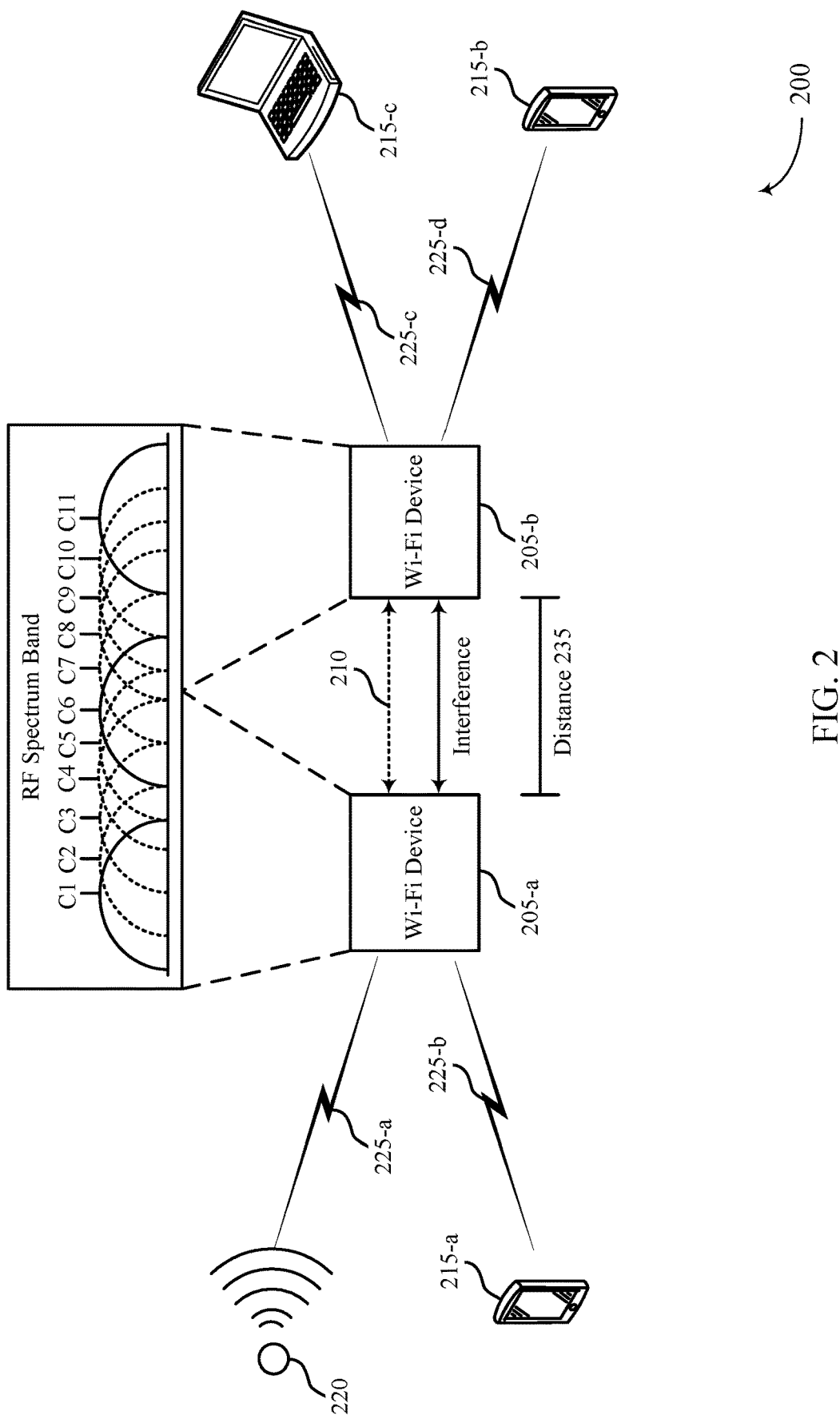

FIG. 2 illustrates an example of a system 200 that supports Wi-Fi routers and switching in accordance with aspects of the present disclosure. In some examples, the system 200 may implement or include one or more aspects of the system 100, as described with reference to FIG. 1. For example, the system 200 may include one or more sensor devices 220 and one or more local computing devices 215 (e.g., local computing devices 215-a, 215-b, and 215-c), which may be examples of a sensor device 110 and a local computing device 115, as described with reference to FIG. 1. In some examples, the system 200 may be associated with a premise such as a building, a home, a business, or the like.

The system 200 may be an example of a Wi-Fi network. For example, the system 200 may support wireless communications between wireless devices of the system 200 over a Wi-Fi network. The Wi-Fi network may be associated with one or more RF spectrum bands. For example, the Wi-Fi network may support wireless communications over one or more RF spectrum bands such as a 2.4 GHz band, one or more 5 GHz bands, some other radio RF band, or some combination of these and other RF spectrum bands. Each RF spectrum band may be associated with (e.g., include, be divided into) a set of Wi-Fi channels, where each channel is associated with (e.g., corresponds to, occupies, spans) a RF spectrum subband of the RF spectrum band. For example, in some cases, a 2.4 GHz band may be divided into eleven Wi-Fi channels (e.g., channels C1 through C11) that each span a particular bandwidth (e.g., 20 MHz, 22 MHz, or some other bandwidth).

The system 200 may include a Wi-Fi device 205-a and a Wi-Fi device 205-b. In some cases, the Wi-Fi device 205-a may be an example of a control panel 135, a server 155, or a Wi-Fi device as described with reference to FIG. 1, that is associated with a security and automation system of the premises. The security and automation system may include the sensor device 220 and the local computing device 215-a, among other wireless devices (not shown). The Wi-Fi device 205-a may facilitate communications between the wireless devices of the security and automation system and a control panel, a server, a network, or a combination thereof, associated with the security and automation system. For example, in some cases, the control panel, server, and network may communicate messages (e.g., data) with the sensor device 220 over a wireless communication link 225-a and the local computing device 215-a over a wireless communication link 225-b via the Wi-Fi device 205-a.

The Wi-Fi device 205-b may facilitate wireless communications between wireless devices of the system 200 that are unassociated with the security and automation system and a network (e.g., a network 125). For example, the system 200 may include the local computing device 215-b and the local computing device 215-c (among other wireless devices) that are unassociated with the security and automation system. The Wi-Fi device 205-b may communicate with the local computing device 215-b over a wireless communication link 225-d and the local computing device 215-c over a wireless communication link 225-c and may provide the local computing device 215-b and the local computing device 215-c access to a network such as the Internet. Additionally, in some examples, the Wi-Fi device 205-*a* and the Wi-Fi device 205-*b* may communicate over a backhaul link 210 such as an ethernet cable or a high-speed wireless communications link (e.g., a 5 GHz link).

The Wi-Fi device 205-*a* and the Wi-Fi device 205-*b* may be located some distance 235 from each other. To reduce interference experienced at the Wi-Fi device 205-*a* and the Wi-Fi device 205-*b*, in some examples, the Wi-Fi device 205-*a* may communicate over one or more Wi-Fi channels (e.g., channels C1 and/or C2) different from Wi-Fi channels over which the Wi-Fi device 205-*b* communicates (e.g., channels C10 and/or C11). However, in some cases, the distance 235 may be relatively small (e.g., 3 feet, 5, feet, 10 feet, 15 feet, or some other distance). In some cases, due to the small distance between the Wi-Fi device 205-*a* and the Wi-Fi device 205-*b*, wireless communications communicated by the Wi-Fi device 205-*a* and the Wi-Fi device 205-*b* may still cause relatively high levels of interference between the Wi-Fi device 205-*a* and the Wi-Fi device 205-*b*. As a result, wireless communications over the Wi-Fi network may suffer reduced reliability, throughput, and signal quality. For example, if the sensor device 220 or the local computing device 215-*a* is a camera-enabled device, signal quality (e.g., video signal quality, audio signal quality) may suffer performance degradation and reduced reliability. Additionally, in some cases, the Wi-Fi device 205-*b* may communicate signals at a relatively higher power compared to the Wi-Fi device 205-*a*. Accordingly, in some cases, the interference experienced at the Wi-Fi device 205-*a* may be relatively higher compared to the interference experienced at the Wi-Fi device 205-*b*. As a result, techniques to increase the reliability of wireless communications via the Wi-Fi device 205-*a* may be particularly desirable.

To increase the reliability of wireless communications via the Wi-Fi device 205-*a* (e.g., associated with the security and automation system), the Wi-Fi device 205-*a* may include a set of RF switches that includes at least a first RF switch and a second RF switch. The first RF switch may provide a first connection for a set of RF signal paths to a processor (e.g., or a Wi-Fi radio chip) of the Wi-Fi device 205-*a*, and the second RF switch may provide a connection for the set of RF signal paths to an antenna of the Wi-Fi device 205-*a*. The set of RF signal paths may include one or more highpass signal paths, lowpass signal paths, bandpass signal paths, or passthrough signal paths, or any combination thereof, that may be selected by the Wi-Fi device 205-*a* for processing wireless communications. For example, the Wi-Fi device 205-*a* may select one or more of the RF signal paths through which to route wireless communications received by the Wi-Fi device 205-*a*.

The Wi-Fi device 205-*a* may determine a set of one or more Wi-Fi channels for wireless communications between the Wi-Fi device 205-*a* and the wireless devices of the security and automation system (e.g., the sensor device 220, the local computing device 215-*a*). For example, the Wi-Fi device 205-*a* may select one or more Wi-Fi channels of an RF spectrum band (e.g., some combination of one or more of channels C1 through C11) over which to communicate with the wireless devices. In some examples, the Wi-Fi device 205-*a* may determine the set of Wi-Fi channels based on scanning the Wi-Fi channels of the RF spectrum band. For example, the Wi-Fi device 205-*a* may scan the Wi-Fi channels to determine channel information such as a channel quality or interference measurements associated with each of the Wi-Fi channels. Based on the channel information, the Wi-Fi device 205-*a* may select the set of Wi-Fi channels. For example, the Wi-Fi device 205-*a* may select the set of Wi-Fi channels that may provide a highest throughput based on the determined channel information. In some examples, the Wi-Fi device 205-*a* may include a dedicated scanning Wi-Fi radio chip that performs the scanning. In some examples, the Wi-Fi device 205-*a* may be configured to determine the set of Wi-Fi channels based on the distance 235 satisfying (e.g., being less than, being less than or equal to) a threshold distance.

In some other examples, the Wi-Fi device 205-*a* may determine the set of one or more Wi-Fi channels based on a user setting to select the one or more Wi-Fi channels. In some cases, the user setting may override the determination of the set of one or more Wi-Fi channels based on scanning the Wi-Fi channels. In still some other examples, the Wi-Fi device 205-*a* may determine the set of one or more Wi-Fi channels based on Wi-Fi channels over which the Wi-Fi device 205-*b* communicates. For example, the Wi-Fi device 205-*a* may select one or more Wi-Fi channels of the RF spectrum band different from the Wi-Fi channels over which the Wi-Fi device 205-*b* communicates (e.g., to reduce potential interference).

Based on determining the set of Wi-Fi channels, the Wi-Fi device 205-*a* may select at least one RF signal path of the set of RF signal paths to pass at least one Wi-Fi channel of the set of Wi-Fi channels. For example, each RF signal path of the set of RF signal paths may correspond to one or more Wi-Fi channels of the RF spectrum band. That is, each RF signal path may pass through signals received over the corresponding one or more Wi-Fi channels while reducing (e.g., blocking, eliminating, decreasing a strength of) signals received over other Wi-Fi channels of the RF spectrum band (e.g., via one or more filters). Accordingly, the Wi-Fi device 205-*a* may set the first RF switch and the second RF switch such that wireless communications communicated by the Wi-Fi device 205-*a* are routed through the one or more RF signal paths corresponding to the determined set of Wi-Fi channels.

The Wi-Fi device 205-*a* may process wireless communications using the at least one RF signal path. For example, the Wi-Fi device 205-*a* may receive wireless communications at the antenna of the Wi-Fi device 205-*a* and may route the wireless communications through the at least one RF signal path to the processor (e.g., or to a Wi-Fi radio chip) of the Wi-Fi device 205-*a*. In this way, the Wi-Fi device 205-*a* may filter out interference caused by wireless communications transmitted over other Wi-Fi channels (e.g., received or transmitted by the Wi-Fi device 205-*b*), thereby increasing the reliability, signal quality, and throughput of the wireless communications, among other benefits. Additionally, or alternatively, the Wi-Fi device 205-*a* may route wireless communications from the processor to the antenna through the at least one RF signal path to transmit the wireless communications.

Figure 3:
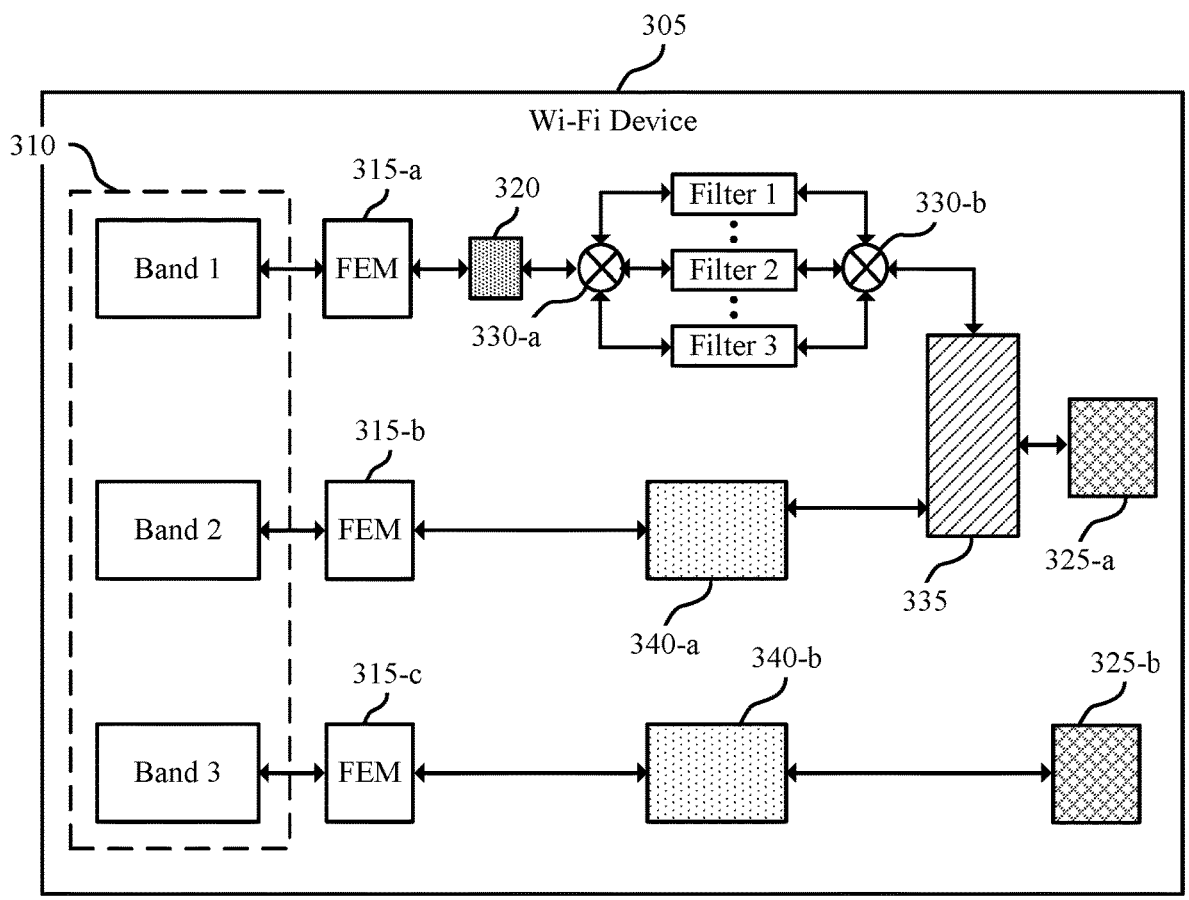
FIG. 3 illustrates an example of an apparatus diagram that supports Wi-Fi routers and switching in accordance with aspects of the present disclosure.

FIG. 3 illustrates an example of an apparatus diagram 300 that supports Wi-Fi routers and switching in accordance with aspects of the present disclosure. In some examples, the apparatus diagram 300 may implement or include one or more aspects of the system 100 or 200, as described with reference to FIGS. 1 and 2, respectively. For example, the apparatus diagram 300 illustrates a Wi-Fi device 305, which may be an example of a control panel 135, a server 155, or a Wi-Fi device 205, as described with reference to FIGS. 1 and 2, respectively. In some cases, the Wi-Fi device 305 may be implemented or used to provide improvements to reliability, signal quality, throughput, latency, power consumption, resource usage, and spectral efficiency.

The Wi-Fi device 305 may include various components to support wireless communications with one or more wireless devices over a Wi-Fi network. For example, the Wi-Fi device 305 may include a chipset 310 (e.g., a Wi-Fi chipset, a processor) that is configured to process wireless communications over one or more RF spectrum bands. For instance, the chipset 310 may configured to process wireless communications communicated over a first RF spectrum band "band 1," a second RF spectrum band "band 2," and a third RF spectrum band "band 3." In some examples, band 1 may be a 2.4 GHz band, band 2 may be a first 5 GHz band, and band 3 may be a second 5 GHz band, although any combination of RF spectrum bands is possible.

The Wi-Fi device 305 may route wireless communications through various RF signal paths based on the frequency at which the wireless communications are transmitted. For example, the Wi-Fi device 305 may route wireless communications transmitted in band 1 between the chipset 310 and an antenna 325-*a* of the Wi-Fi device 305 via a first RF signal path, wireless communications transmitted in band 2 between the chipset 310 and the antenna 325-*a* (e.g., or a different antenna 325) via a second RF signal path, and wireless communications transmitted in band 3 between the chipset 310 and an antenna 325-*b* via a third RF signal path.

The Wi-Fi device 305 may include various components along each RF signal path of the Wi-Fi device 305. Among other components, the Wi-Fi device 305 may include one or more front-end modules (FEMs) 315 that are used to amplify signals routed through the Wi-Fi device 305. In some examples, the Wi-Fi device 305 may include an FEM 315 for each RF spectrum band over which the Wi-Fi device 305 is configured to communicate. For example, the Wi-Fi device 305 may include an FEM 315-*a* used to amplify wireless communications routed through the first RF signal path (e.g., transmitted in band 1), an FEM 315-*b* used to amplify wireless communications routed through the second RF signal path (e.g., transmitted in band 2), and an FEM 315-*c* used to amplify wireless communications routed through the third RF signal path (e.g., transmitted in band 3).

The Wi-Fi device 305 may include a diplexer 335 (e.g., along the first RF signal path and the second RF signal path). The diplexer 335 may enable the Wi-Fi device 305 to communicate wireless communications transmitted in different RF spectrum bands using a same antenna 325. For example, the Wi-Fi device 305 may use the diplexer 335 to communicate band 1 and band 2 wireless communications using the antenna 325-*a*. In some examples, the diplexer 335 may include a filter that separates band 1 wireless communications from band 2 wireless communications and vice versa. The Wi-Fi device 305 may include the antenna 325-*b* to communicate band 3 wireless communications. In some examples, the antenna 325-*a* and the antenna 325-*b* may each couple to the Wi-Fi device 305 via an RF connector (e.g., a u.fl connector or some other RF connector).

The first RF signal path (e.g., associated with band 1 wireless communications), in some examples, may include a filter 320. The Wi-Fi device 305 may use the filter 320 to filter out (e.g., block, reduce the signal strength of) wireless communications transmitted in an RF spectrum band different than band 1 (e.g., band 2 wireless communications, band 3 wireless communications). The filter 320 may be used to reduce interference experienced in band 1 caused by harmonic signals or other out-of-band signals.

Additionally, the Wi-Fi device 305 may include a set of RF switches 330 to further divide the first RF signal path into a set of RF signal paths. For example, the Wi-Fi device 305 may include a switch 330-*a* that provides a connection of the set of RF signal paths to the chipset 310. Additionally, the Wi-Fi device 305 may include a switch 330-*b* that provides a connection of the set of RF signal paths to the antenna 325-*a* (e.g., via the diplexer 335). The Wi-Fi device 305 may set the switch 330-*a* and the 330-*b* to determine through which RF signal path(s) of the set of RF signal paths band 1 wireless communications are routed.

The set of RF signal paths may include one or more highpass signal paths, lowpass signal paths, bandpass signal paths, or passthrough signal paths, or any combination thereof. Each RF signal path may correspond to one or more Wi-Fi channels of band 1. For example, band 1 may include a set of Wi-Fi channels that each correspond to (e.g., span) an RF subband of band 1 and each RF signal path may correspond to one or more Wi-Fi channels of the set of Wi-Fi channels. Each RF signal path may include one or more filters (e.g., highpass filters, lowpass filters, bandpass filters, passthrough filters, or any combination thereof) that pass signals communicated over the corresponding one or more Wi-Fi channels and block (e.g., reduce the signal strength of) signals communicated over other Wi-Fi channels of the set of Wi-Fi channels. In some examples, the filters may be selected to include in the Wi-Fi device 305 based on one or more filter characteristics. For example, the filters may have be selected such that an insertion loss of the filter satisfies (e.g., is less than, is less than or equal to) a threshold insertion loss (e.g., 1.2 decibels (dB), or some other insertion loss), a rejection (e.g., attenuation) of the filter at a desired frequency satisfies (e.g., is greater than, is greater than or equal to) a threshold (e.g., a 40 dB attenuation at the desired frequency, or some other attenuation), or a combination thereof.

The Wi-Fi device 305 may determine one or more Wi-Fi channels of band 1 over which to communicate wireless communications (e.g., based on scanning the set of Wi-Fi channels to determine associated channel information, based on a user entered setting). Based on the determination, the Wi-Fi device 305 may select at least one RF signal path of the set of RF signal paths through which to route band 1 wireless communications. For example, the Wi-Fi device 305 may set the switch 330-*a* and the switch 330-*b* such that band 1 wireless communications are routed through the at least on RF signal path. The Wi-Fi device 305 may then process band 1 wireless communications using the at least one RF signal path. Accordingly, in some examples, the Wi-Fi device 305 may route band 1 wireless communications between the chipset 310 and the antenna 325-*a* through the FEM 315-*a*, the filter 320, the at least one RF signal path, and the diplexer 335. In this way, the Wi-Fi device 305 may reduce interference and increase reliability, throughput, and signal quality of band 1 wireless communications. For example, band 1 wireless communications that are transmitted in other Wi-Fi channels of band 1 may be filtered out, thereby reducing the interference caused by such band 1 wireless communications and increasing the reliability, throughput, and signal quality of band 1 wireless communications communicated over the one or more determined Wi-Fi channels.

Additionally, the Wi-Fi device 305 may be triggered to reselect the at least one RF signal path through which band 1 wireless communications are routed. For example, the Wi-Fi device 305 may detect that a channel quality of the one or more determined Wi-Fi channels satisfies (e.g., is less than, is less than or equal to) a threshold channel quality. Here, the detecting may trigger the Wi-Fi device 305 to scan the set of Wi-Fi channels of band 1 to determine a new set of one or more Wi-Fi channels over which to communicate band 1 wireless communications. In some examples, the Wi-Fi device 305 may enable a timer in response to the detecting. Here, the timer lapsing while the channel quality still satisfies the threshold channel quality may trigger the Wi-Fi device 305 to determine the new set of one or more Wi-Fi channels. In some cases, the threshold channel quality may be based on channel qualities associated with the set of Wi-Fi channels of band 1. For example, the Wi-Fi device 305 may scan the set of Wi-Fi channels to determine a respective channel quality associated with each Wi-Fi channel. If the channel qualities are relatively low, the threshold channel quality may be set relatively low. Alternatively, as the channel qualities increase, the threshold channel quality may increase as well. In some other examples, the Wi-Fi device 305 may be reset (e.g., power cycled, reconfigured). The Wi-Fi device 305 may determine a reset condition which may trigger the Wi-Fi device 305 to determine the new set of one or more Wi-Fi channels. In still some other examples, the Wi-Fi device 305 may determine that a threshold duration of time has passed since determining the previous set of Wi-Fi channels, which may trigger the Wi-Fi device 305 to determine the new set of one or more Wi-Fi channels. For example, the Wi-Fi device 305 may be configured to periodically determine the new set of one or more Wi-Fi channels. In some examples, the new set of one or more Wi-Fi channels may be the same set of one or more Wi-Fi channels as the previous set, include one or more Wi-Fi channels of the previous set, or be different from the previous set. In some examples, the Wi-Fi device 305 may determine the new set of one or more Wi-Fi channels based on a user setting to select the new set of one or more Wi-Fi channels.

Based on determining the new set of one or more Wi-Fi channels, the Wi-Fi device 305 may select at least one RF signal path corresponding to the new set of one or more Wi-Fi channels and may set the switch 330-*a* and the switch 330-*b* accordingly. The Wi-Fi device 305 may then process band 1 wireless communications using the at least one RF signal path corresponding to the new set of one or more Wi-Fi channels.

The second RF signal path (e.g., associated with band 2 wireless communications) may include a filter 340-*a* used to filter out (e.g., block, reduce the signal strength of) wireless communications transmitted in an RF spectrum band different than band 2 (e.g., band 1 wireless communications, band 3 wireless communications). The filter 340-*a* may be used to reduce interference experienced in band 2 caused by harmonic signals or other out-of-band signals. In some examples, the second RF signal path may not include a set of RF switches 330 to divide the second RF signal path. That is, to communicate over band 2, the Wi-Fi device 305 may route wireless communications between the chipset 310 and the antenna 325-*a* through the FEM 315-*b*, the filter 340-*a*, and the diplexer 335.

The third RF signal path (e.g., associated with band 3 wireless communications) may include a filter 340-*b* used to filter out (e.g., block, reduce the signal strength of) wireless communications transmitted in an RF spectrum band different than band 3 (e.g., band 1 wireless communications, band 2 wireless communications). The filter 340-*b* may be used to reduce interference experienced in band 3 caused by harmonic signals or other out-of-band signals. In some examples, the third RF signal path may not include a set of RF switches 330 to divide the third RF signal path. That is, to communicate over band 3, the Wi-Fi device 305 may route wireless communications between the chipset 310 and the antenna 325-*b* through the FEM 315-*c* and the filter 340-*b*.

It is noted that, for illustrative purposes, FIG. 3 depicts the Wi-Fi device 305 as being configured and including circuitry to operate over three different RF spectrum bands. The Wi-Fi device 305, however, may be adapted to operate over any number RF spectrum bands (e.g., one, two, four, five, etc.)

Figure 4:
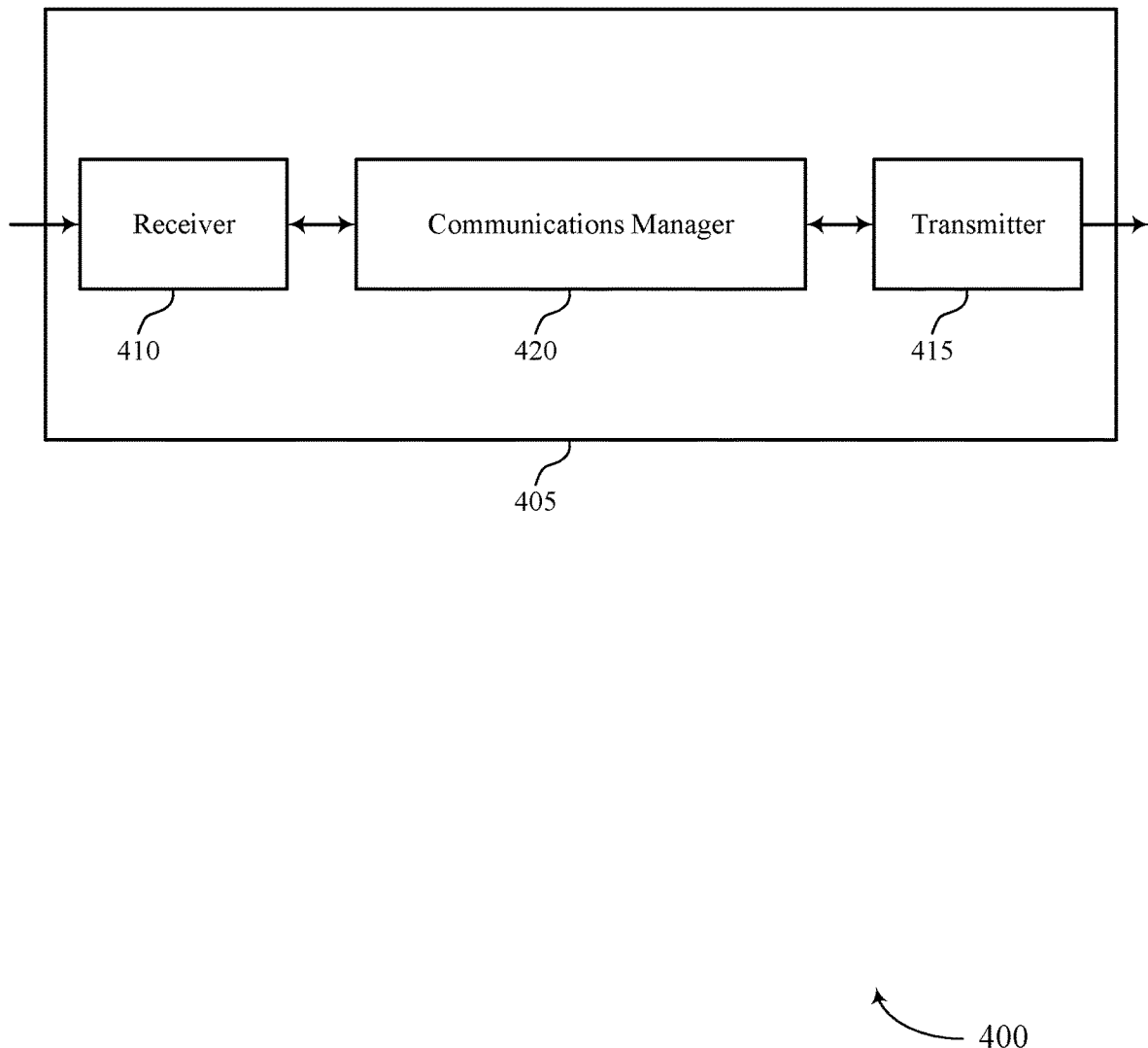
FIGS. 4 and 5 show block diagrams of devices that support Wi-Fi routers and switching in accordance with aspects of the present disclosure.

FIG. 4 shows a block diagram 400 of a device 405 that supports Wi-Fi routers and switching in accordance with aspects of the present disclosure. The device 405 may be an example of aspects of one or more of a Wi-Fi router or a Wi-Fi modem as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to Wi-Fi routers and switching). Information may be passed on to other components of the device 405. The receiver 410 may utilize a single antenna or a set of multiple antennas. The transmitter 415 may provide a means for transmitting signals generated by other components of the device 405. The transmitter 415 may utilize a single antenna or a set of multiple antennas.

The communications manager 420, the receiver 410, the transmitter 415, or various combinations thereof or various components thereof may be examples of means for performing various aspects of Wi-Fi routers and switching as described herein. For example, the communications manager 420, the receiver 410, the transmitter 415, or various combinations or components thereof may support a method for performing one or more of the functions described herein. In some examples, the communications manager 420, the receiver 410, the transmitter 415, or various combinations or components thereof may be implemented in hardware (e.g., in communications management circuitry). The hardware may include a processor, one or more Wi-Fi radio chips, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor (e.g., and one or more Wi-Fi radio chips coupled with the processor) may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at the device 405 in a Wi-Fi network in accordance with examples as disclosed herein. For example, the communications manager 420 may be configured as or otherwise support a means for determining a set of Wi-Fi channels for wireless communication with one or more wireless devices in the Wi-Fi network, where the device 405 includes a processor and a set of RF switches. A first RF switch of the set of RF switches providing a first connection for a set of RF signal paths to the processor and a second RF switch of the set of RF switches providing a second connection for the set of RF signal paths to an antenna of the device 405.

The communications manager 420 may be configured as or otherwise support a means for selecting at least one RF signal path from the set of RF signal paths to pass at least one Wi-Fi channel of the set of Wi-Fi channels, where the set of RF signal paths includes one or more highpass signal paths, lowpass signal paths, bandpass signal paths, or passthrough signal paths, or any combination thereof. The communications manager 420 may be configured as or otherwise support a means for processing the wireless communication in the Wi-Fi network based on passing the at least one Wi-Fi channel of the set of Wi-Fi channels using the at least one RF signal path from the set of RF signal paths.

Figure 5:
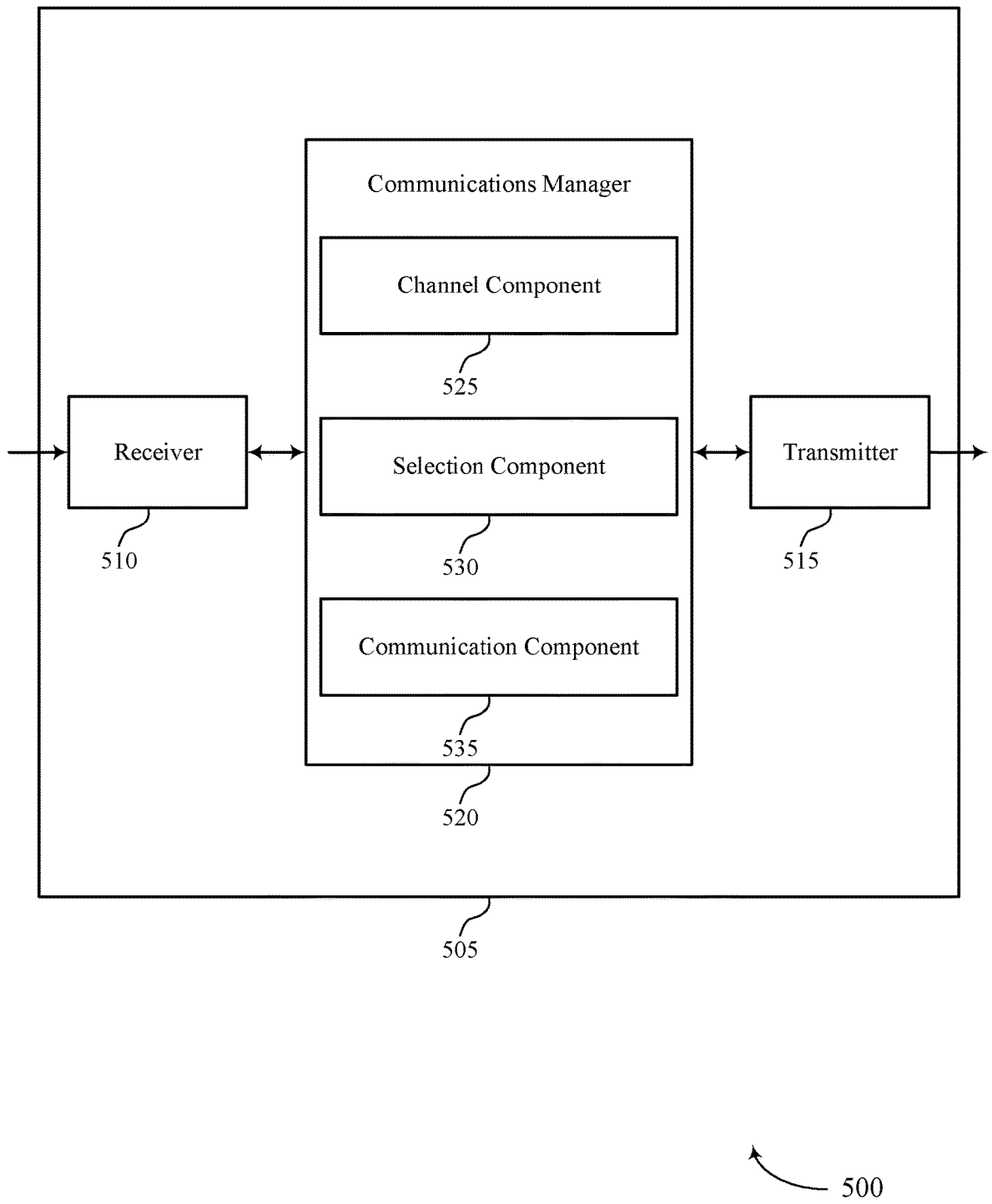

FIG. 5 shows a block diagram 500 of a device 505 that supports Wi-Fi routers and switching in accordance with aspects of the present disclosure. The device 505 may be an example of aspects of a device 405 or one or more of a Wi-Fi router or a Wi-Fi modem as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to Wi-Fi routers and switching). Information may be passed on to other components of the device 505. The receiver 510 may utilize a single antenna or a set of multiple antennas. The transmitter 515 may provide a means for transmitting signals generated by other components of the device 505. The transmitter 515 may utilize a single antenna or a set of multiple antennas.

The device 505, or various components thereof, may be an example of means for performing various aspects of Wi-Fi routers and switching as described herein. For example, the communications manager 520 may include a channel component 525, a selection component 530, a communication component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 in a Wi-Fi network in accordance with examples as disclosed herein. The channel component 525 may be configured as or otherwise support a means for determining a set of Wi-Fi channels for the wireless communication with one or more wireless devices in the Wi-Fi network. The device 505 includes a processor and a set of RF switches, a first RF switch of the set of RF switches providing a first connection for a set of RF signal paths to the processor, a second RF switch of the set of RF switches providing a second connection for the set of RF signal paths to an antenna of the device 505.

The selection component 530 may be configured as or otherwise support a means for selecting at least one RF signal path from the set of RF signal paths to pass at least one Wi-Fi channel of the set of Wi-Fi channels. The set of RF signal paths includes one or more highpass signal paths, lowpass signal paths, bandpass signal paths, or passthrough signal paths, or any combination thereof. The communication component 535 may be configured as or otherwise support a means for processing the wireless communication in the Wi-Fi network based on passing the at least one Wi-Fi channel of the set of Wi-Fi channels using the at least one RF signal path from the set of RF signal paths.

Figure 6:
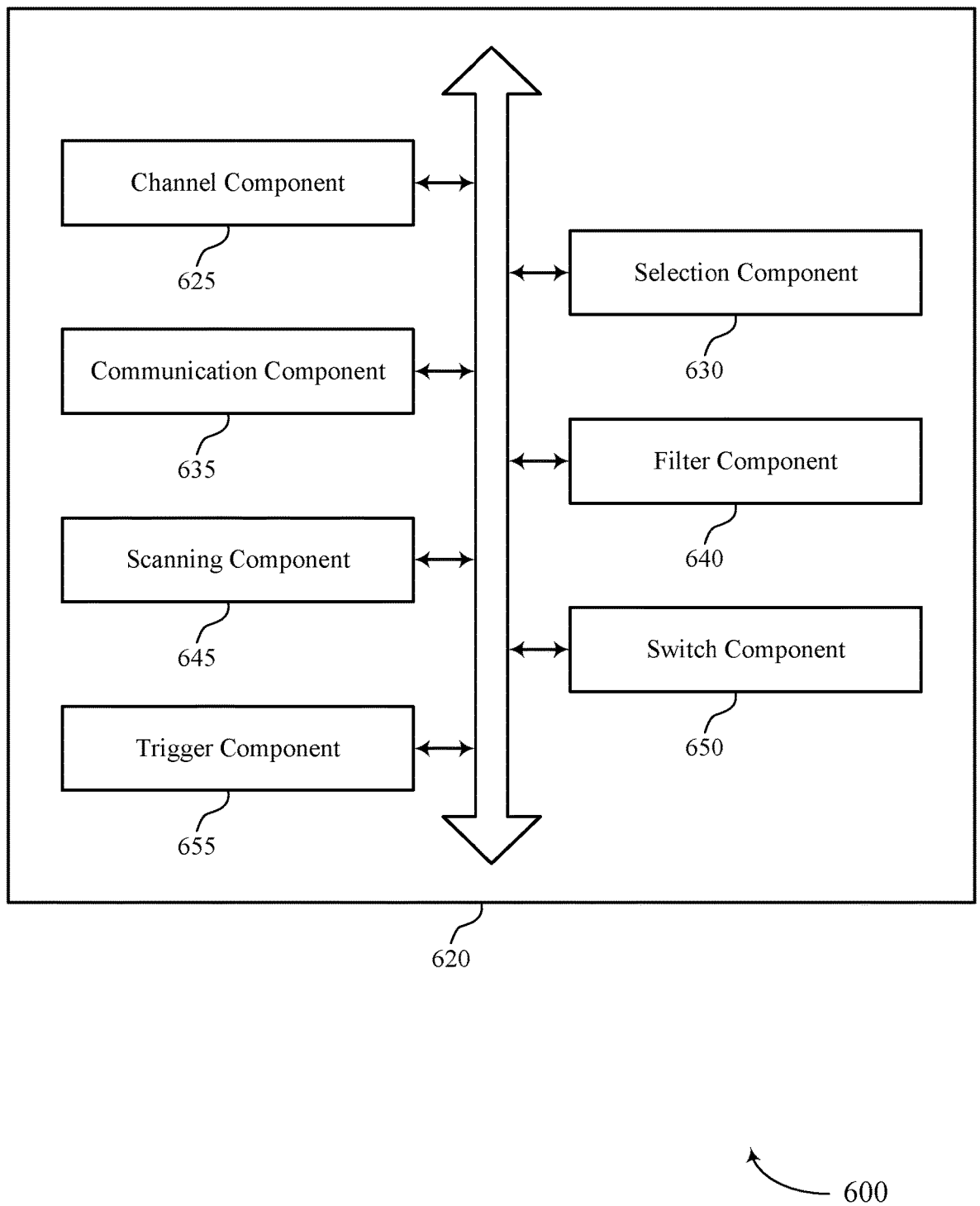
FIG. 6 shows a block diagram of a communications manager that supports Wi-Fi routers and switching in accordance with aspects of the present disclosure.

FIG. 6 shows a block diagram 600 of a communications manager 620 that supports Wi-Fi routers and switching in accordance with aspects of the present disclosure. The communications manager 620 may be an example of aspects of a communications manager 420, a communications manager 520, or both, as described herein. The communications manager 620, or various components thereof, may be an example of means for performing various aspects of Wi-Fi routers and switching as described herein. For example, the communications manager 620 may include a channel component 625, a selection component 630, a communication component 635, a filter component 640, a scanning component 645, a switch component 650, a trigger component 655, or any combination thereof. Each of these components may communicate, directly or indirectly, with one another (e.g., via one or more buses).

The communications manager 620 may support wireless communication at an apparatus in a Wi-Fi network in accordance with examples as disclosed herein. The channel component 625 may be configured as or otherwise support a means for determining a set of Wi-Fi channels for the wireless communication with one or more wireless devices in the Wi-Fi network. The apparatus includes a processor and a set of RF switches. A first RF switch of the set of RF switches providing a first connection for a set of RF signal paths to the processor. A second RF switch of the set of RF switches providing a second connection for the set of RF signal paths to an antenna of the apparatus.

The selection component 630 may be configured as or otherwise support a means for selecting at least one RF signal path from the set of RF signal paths to pass at least one Wi-Fi channel of the set of Wi-Fi channels. The set of RF signal paths includes one or more highpass signal paths, lowpass signal paths, bandpass signal paths, or passthrough signal paths, or any combination thereof. The communication component 635 may be configured as or otherwise support a means for processing the wireless communication in the Wi-Fi network based on passing the at least one Wi-Fi channel of the set of Wi-Fi channels using the at least one RF signal path from the set of RF signal paths.

In some examples, to support processing the wireless communication, the communication component 635 may be configured as or otherwise support a means for receiving the wireless communication from the one or more wireless devices. In some examples, to support processing the wireless communication, the filter component 640 may be configured as or otherwise support a means for filtering the wireless communication using a filter included in the at least one RF signal path. In some examples, the scanning component 645 may be configured as or otherwise support a means for scanning the set of Wi-Fi channels to determine a channel quality associated with each Wi-Fi channel of the set of Wi-Fi channels, where the instructions to select the at least one RF signal path are further executable by the processor based on the scan.

In some examples, to support selecting the at least one RF signal path, the selection component 630 may be configured as or otherwise support a means for selecting the at least one RF signal path based on a user setting to select the at least one RF signal path. In some examples, the switch component 650 may be configured as or otherwise support a means for setting the first RF switch to provide the first connection for the at least one RF signal path based on the selection of the at least one RF signal path. In some examples, the switch component 650 may be configured as or otherwise support a means for setting the second RF switch to provide the second connection for the at least one RF signal path based on the selection of the at least one RF signal path.

In some examples, the trigger component 655 may be configured as or otherwise support a means for selecting, based on a trigger, a second RF signal path from the set of RF signal paths to pass a second Wi-Fi channel of the set of Wi-Fi channels. In some examples, the communication component 635 may be configured as or otherwise support a means for processing a second wireless communication in the Wi-Fi network based on passing the second Wi-Fi channel of the set of Wi-Fi channels using the second RF signal path from the set of RF signal paths. In some examples, the trigger component 655 may be configured as or otherwise support a means for detecting that a channel quality associated with the at least one Wi-Fi channel satisfies a threshold, where the trigger corresponds to the channel quality associated with the at least one Wi-Fi channel satisfying the threshold.

In some examples, the trigger component 655 may be configured as or otherwise support a means for enabling a timer based on the channel quality associated with the at least one Wi-Fi channel satisfying the threshold, where the trigger corresponds to the timer lapsing. In some examples, the scanning component 645 may be configured as or otherwise support a means for scanning the set of Wi-Fi channels to determine a respective channel quality associated with each Wi-Fi channel of the set of Wi-Fi channels, where the threshold is based on the respective channel qualities. In some examples, the trigger component 655 may be configured as or otherwise support a means for determining a reset condition of the apparatus, where the trigger corresponds to the reset condition. In some examples, the set of RF signal paths includes a set of filters, each filter of the set of filters corresponding to a RF signal path of the set of RF signal paths. In some examples, the apparatus includes one or more Wi-Fi radio chips coupled with the processor.

In some examples, the set of Wi-Fi channels corresponds to a first RF spectrum band, each Wi-Fi channel corresponding to a RF spectrum subband of the first RF spectrum band. In some examples, the first RF spectrum band is a 2.4 GHz band. In some examples, the apparatus is located within a threshold distance of a Wi-Fi device in the Wi-Fi network. In some examples, the one or more wireless devices are camera-enabled devices. In some examples, the apparatus is a Wi-Fi device associated with one or more of an automation system, a security system, or a home automation system.

Figure 7:
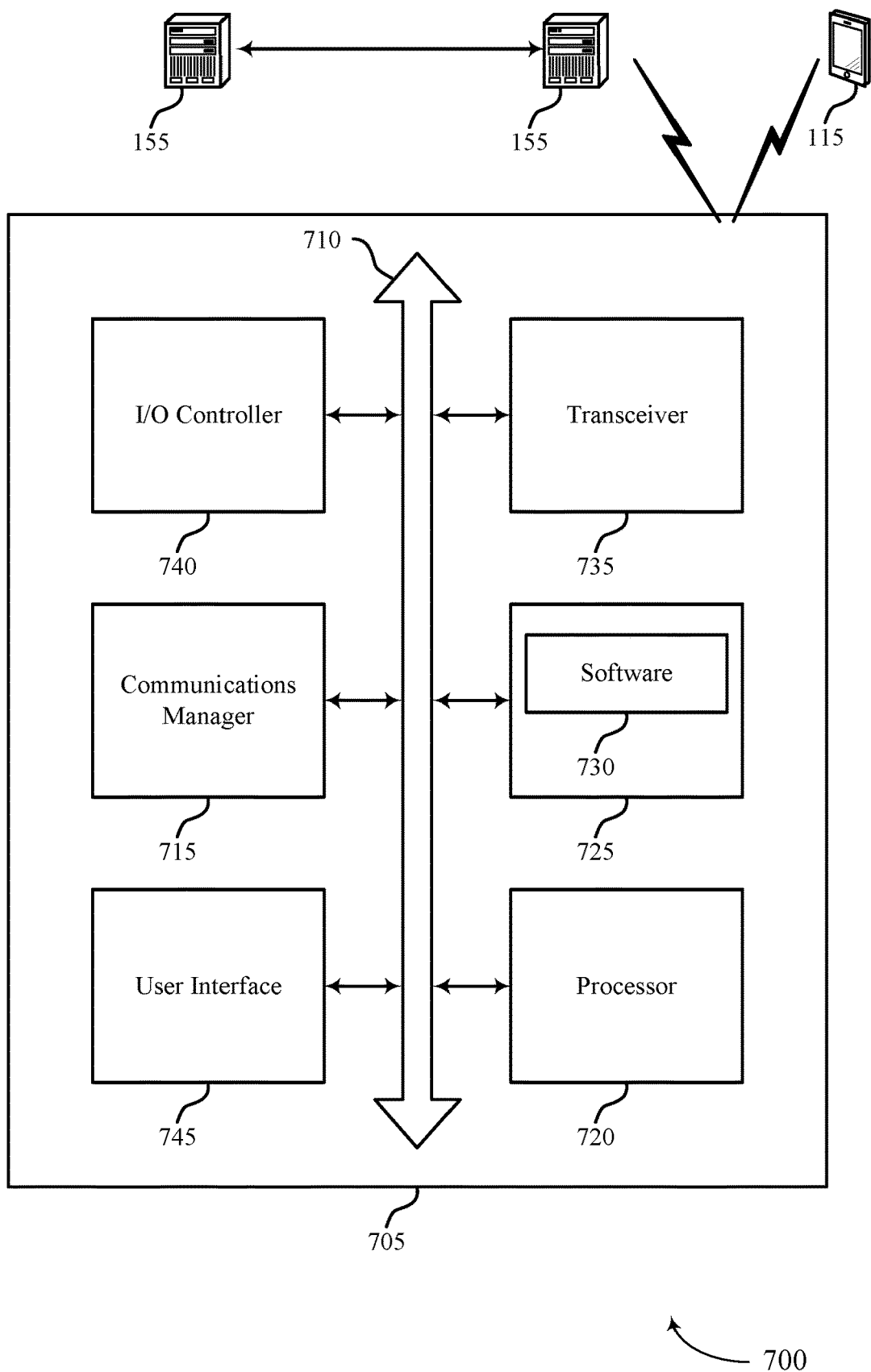
FIG. 7 shows a diagram of a system including a device that supports Wi-Fi routers and switching in accordance with aspects of the present disclosure.

FIG. 7 shows a diagram of a system 700 including a device 705 that supports Wi-Fi routers and switching in accordance with aspects of the present disclosure. The device 705 may be an example of or include the components of a device 405, a device 505, Wi-Fi mode, or a Wi-Fi router as described herein. The device 705 may include components for bi-directional voice and data communications including components for transmitting and receiving communications, such as a communications manager 715, a processor 720, a memory 725, a software 730, a transceiver 735, an input/output (I/O) controller 740, and a user interface 745. These components may be in electronic communication via one or more buses (e.g., bus 710).

In some cases, the device 705 may communicate with a remote storage device or a remote server 155. For example, one or more elements of the device 705 may provide a direct connection to a remote server 155 via a direct network link to the Internet via a point-of-presence (PoP). In some examples, one element of the device 705 (e.g., one or more antennas, transceivers, etc.) may provide a connection using wireless techniques, including digital cellular telephone connection, Cellular Digital Packet Data (CDPD) connection, digital satellite data connection, or another connection.

Many other devices and subsystems may be connected to one or may be included as one or more elements of the system 700 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some examples, all of the elements shown in FIG. 7 need not be present to practice the present systems and methods. The devices and subsystems may also be interconnected in different ways from that shown in FIG. 7. In some examples, an aspect of the operations of the system 700 may be readily known in the art and are not discussed in detail in this disclosure.

The signals associated with the system 700 may include wireless communication signals such as RF, electromagnetics, LAN, WAN, virtual private network (VPN), wireless network (using 802.11, for example), 345 MHz, Z-WAVE®, cellular network (using 3G, 4G, and/or 5G, for example), and/or other signals. The radio access technology (RAT) of the system 700 may be related to, but are not limited to, wireless WAN (WWAN) (e.g., GSM, CDMA, and WCDMA), wireless local area network (WLAN) (including user equipment (UE) BLUETOOTH® and Wi-Fi), WMAN (WiMAX), antennas for mobile communications, antennas for Wireless Personal Area Network (WPAN) applications (including RF identification (RFID) and ultra-wideband (UWB)). In some cases, one or more sensors (e.g., motion, proximity, smoke, light, glass break, door, window, carbon monoxide, and/or another sensor) may connect to some element of the system 700 via a network using the one or more wired and/or wireless connections.

The communications manager 715 may support wireless communication at the device 705 in a Wi-Fi network in accordance with examples as disclosed herein. For example, the communications manager 715 may be configured as or otherwise support a means for determining a set of Wi-Fi channels for the wireless communication with one or more wireless devices in the Wi-Fi network. The device 705 includes a processor and a set of RF switches. A first RF switch of the set of RF switches providing a first connection for a set of RF signal paths to the processor. A second RF switch of the set of RF switches providing a second connection for the set of RF signal paths to an antenna (e.g., of the transceiver 735) of the device 705.

The communications manager 715 may be configured as or otherwise support a means for selecting at least one RF signal path from the set of RF signal paths to pass at least one Wi-Fi channel of the set of Wi-Fi channels. The set of RF signal paths includes one or more highpass signal paths, lowpass signal paths, bandpass signal paths, or passthrough signal paths, or any combination thereof. The communications manager 715 may be configured as or otherwise support a means for processing the wireless communication in the Wi-Fi network based on passing the at least one Wi-Fi channel of the set of Wi-Fi channels using the at least one RF signal path from the set of RF signal paths.

The processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 720 may be configured to operate a memory array using a memory controller. In other cases, a memory controller may be integrated into the processor 720. The processor 720 may be configured to execute computer-readable instructions stored in a memory to perform various functions (e.g., functions or tasks supporting RF signal path switching).

The memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic I/O system (BIOS) which may control basic hardware or software operation such as the interaction with peripheral components or devices. The software 730 may include code to implement aspects of the present disclosure, including code to support dedicated wireless network for security and automation system. The software 730 may be stored in a non-transitory computer-readable medium such as system memory or other memory. In some cases, the software 730 may not be directly executable by the processor but may cause a computer (e.g., when compiled and executed) to perform functions described herein.

The transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

The I/O controller 740 may manage input and output signals for the device 705. The I/O controller 740 may also manage peripherals not integrated into device 705. In some cases, the I/O controller 740 may represent a physical connection or port to an external peripheral. In some cases, the I/O controller 740 may utilize an operating system such as iOS®, ANDROID®, MS-DOS®, MS-WINDOWS®, OS/2®, UNIX®, LINUX®, or another known operating system. In other cases, the I/O controller 740 may represent or interact with a modem, a keyboard, a mouse, a touchscreen, or a similar device. In some cases, the I/O controller 740 may be implemented as part of a processor. In some cases, a user may interact with the device 705 via the I/O controller 740 or via hardware components controlled by the I/O controller 740.

The user interface 745 may enable a user to interact with the device 705. In some examples, the user interface 745 may include an audio device, such as an external speaker system, an external display device such as a display screen, or an input device (e.g., remote control device interfaced with the user interface directly or through the I/O controller).

Figure 8:
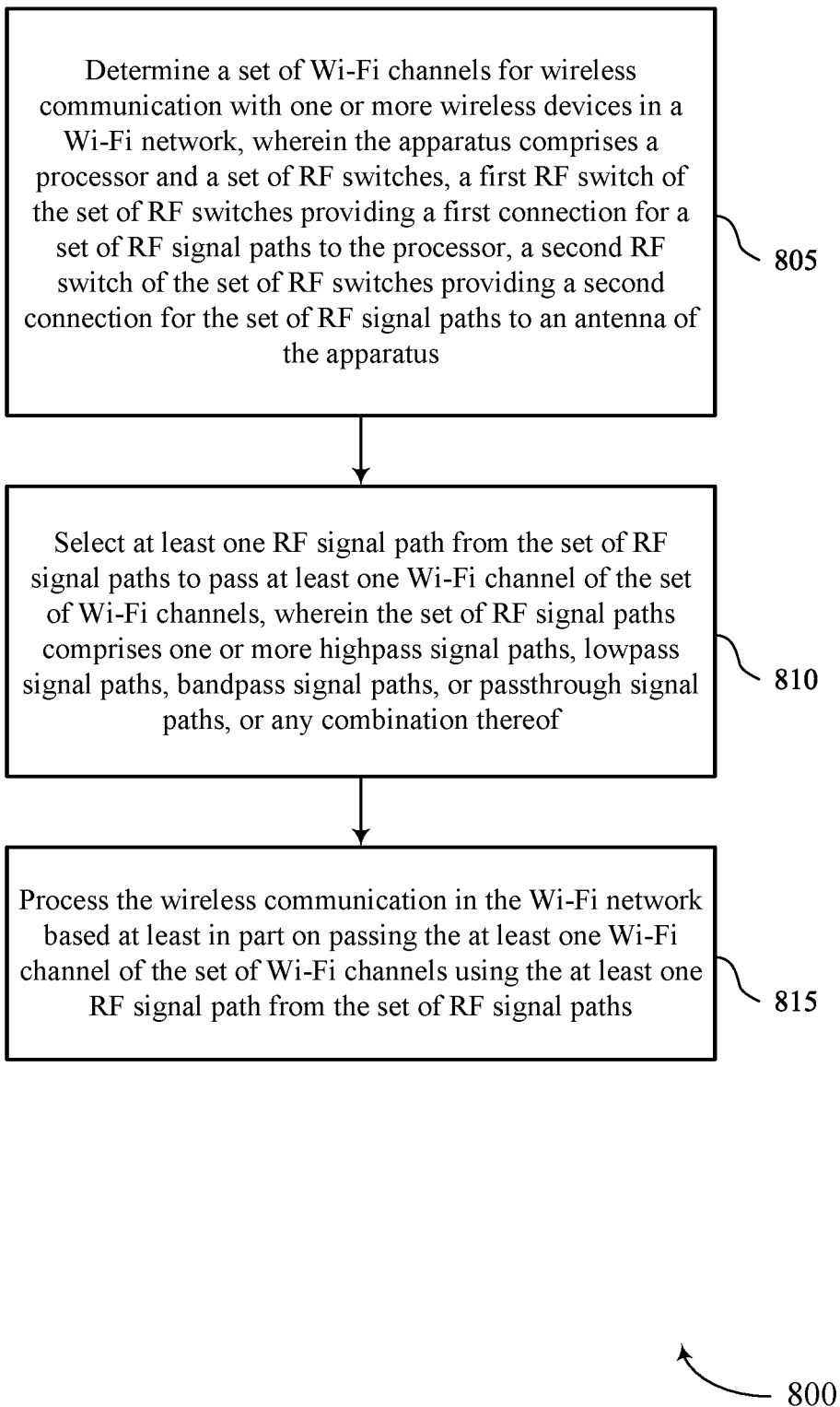
FIGS. 8 through 10 show flowcharts illustrating methods that support Wi-Fi routers and switching in accordance with aspects of the present disclosure.

FIG. 8 shows a flowchart illustrating a method 800 that supports Wi-Fi routers and switching in accordance with aspects of the present disclosure. The operations of the method 800 may be implemented by an apparatus in a Wi-Fi network as described herein. For example, the operations of the method 800 may be performed by a Wi-Fi device as described with reference to FIGS. 1 through 7. In some examples, a Wi-Fi device may execute a set of instructions to control the functional elements of the Wi-Fi device to perform the described functions. Additionally or alternatively, the Wi-Fi device may perform aspects of the described functions using special-purpose hardware.

At 805, the method may include determining a set of Wi-Fi channels for wireless communication with one or more wireless devices in a Wi-Fi network, where the apparatus (e.g., the Wi-Fi device) includes a processor and a set of RF switches, a first RF switch of the set of RF switches providing a first connection for a set of RF signal paths to the processor, a second RF switch of the set of RF switches providing a second connection for the set of RF signal paths to an antenna of the apparatus. The operations of 805 may be performed in accordance with examples as disclosed herein. In some examples, aspects of the operations of 805 may be performed by a channel component 625 as described with reference to FIG. 6.

At 810, the method may include selecting at least one RF signal path from the set of RF signal paths to pass at least one Wi-Fi channel of the set of Wi-Fi channels, where the set of RF signal paths includes one or more highpass signal paths, lowpass signal paths, bandpass signal paths, or passthrough signal paths, or any combination thereof. The operations of 810 may be performed in accordance with examples as disclosed herein. In some examples, aspects of the operations of 810 may be performed by a selection component 630 as described with reference to FIG. 6.

At 815, the method may include processing the wireless communication in the Wi-Fi network based on passing the at least one Wi-Fi channel of the set of Wi-Fi channels using the at least one RF signal path from the set of RF signal paths. The operations of 815 may be performed in accordance with examples as disclosed herein. In some examples, aspects of the operations of 815 may be performed by a communication component 635 as described with reference to FIG. 6.

Figure 9:
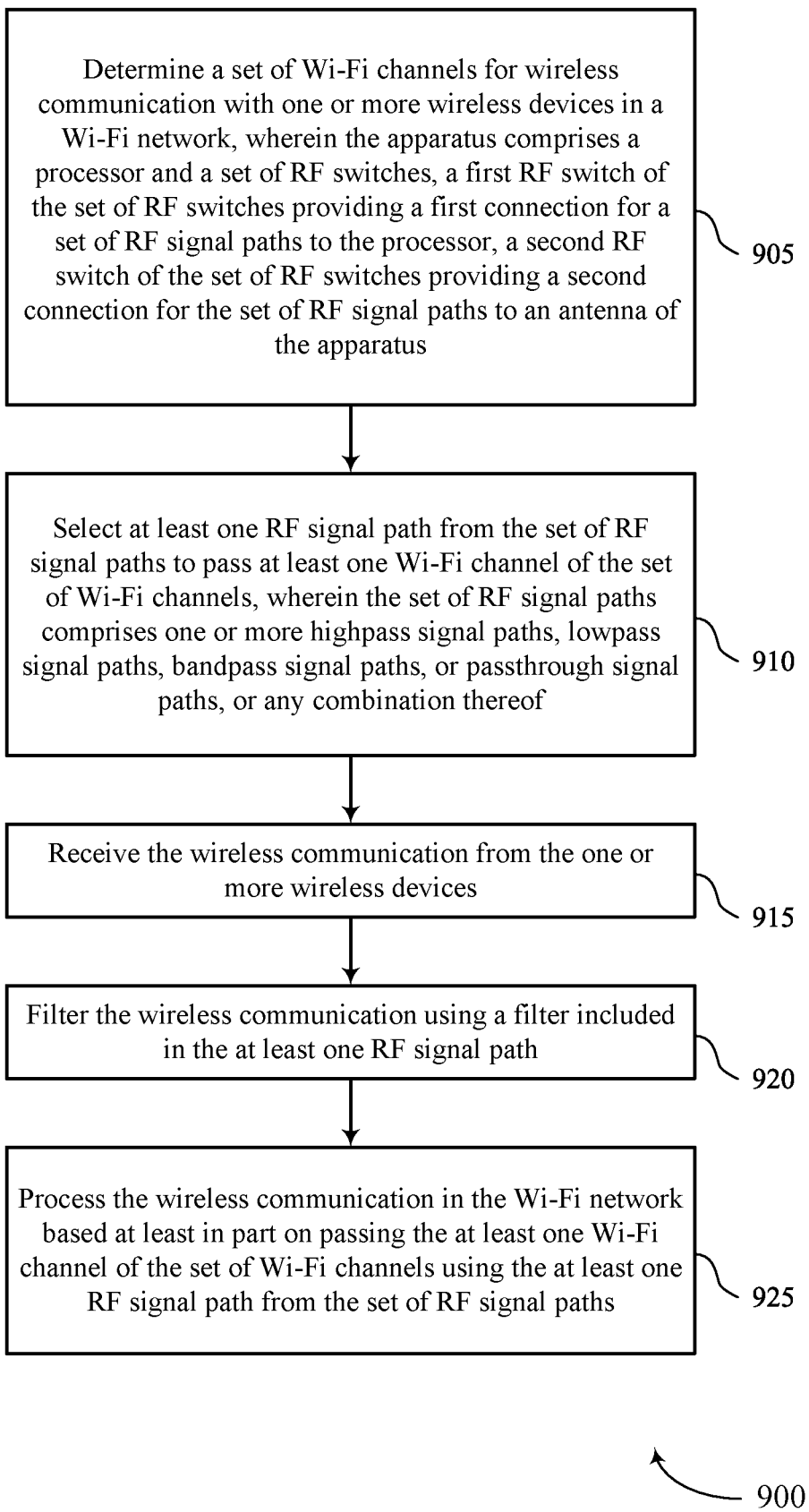

FIG. 9 shows a flowchart illustrating a method 900 that supports Wi-Fi routers and switching in accordance with aspects of the present disclosure. The operations of the method 900 may be implemented by an apparatus in a Wi-Fi network as described herein. For example, the operations of the method 900 may be performed by a Wi-Fi device as described with reference to FIGS. 1 through 7. In some examples, a Wi-Fi device may execute a set of instructions to control the functional elements of the Wi-Fi device to perform the described functions. Additionally or alternatively, the Wi-Fi device may perform aspects of the described functions using special-purpose hardware.

At 905, the method may include determining a set of Wi-Fi channels for wireless communication with one or more wireless devices in a Wi-Fi network, where the apparatus (e.g., the Wi-Fi device) includes a processor and a set of RF switches, a first RF switch of the set of RF switches providing a first connection for a set of RF signal paths to the processor, a second RF switch of the set of RF switches providing a second connection for the set of RF signal paths to an antenna of the apparatus. The operations of 905 may be performed in accordance with examples as disclosed herein. In some examples, aspects of the operations of 905 may be performed by a channel component 625 as described with reference to FIG. 6.

At 910, the method may include selecting at least one RF signal path from the set of RF signal paths to pass at least one Wi-Fi channel of the set of Wi-Fi channels, where the set of RF signal paths includes one or more highpass signal paths, lowpass signal paths, bandpass signal paths, or pass-through signal paths, or any combination thereof. The operations of 910 may be performed in accordance with examples as disclosed herein. In some examples, aspects of the operations of 910 may be performed by a selection component 630 as described with reference to FIG. 6.

At 915, the method may include receiving the wireless communication from the one or more wireless devices. The operations of 915 may be performed in accordance with examples as disclosed herein. In some examples, aspects of the operations of 915 may be performed by a communication component 635 as described with reference to FIG. 6.

At 920, the method may include filtering the wireless communication using a filter included in the at least one RF signal path. The operations of 920 may be performed in accordance with examples as disclosed herein. In some examples, aspects of the operations of 920 may be performed by a filter component 640 as described with reference to FIG. 6.

At 925, the method may include processing the wireless communication in the Wi-Fi network based on passing the at least one Wi-Fi channel of the set of Wi-Fi channels using the at least one RF signal path from the set of RF signal paths. The operations of 925 may be performed in accordance with examples as disclosed herein. In some examples, aspects of the operations of 925 may be performed by a communication component 635 as described with reference to FIG. 6.

Figure 10:
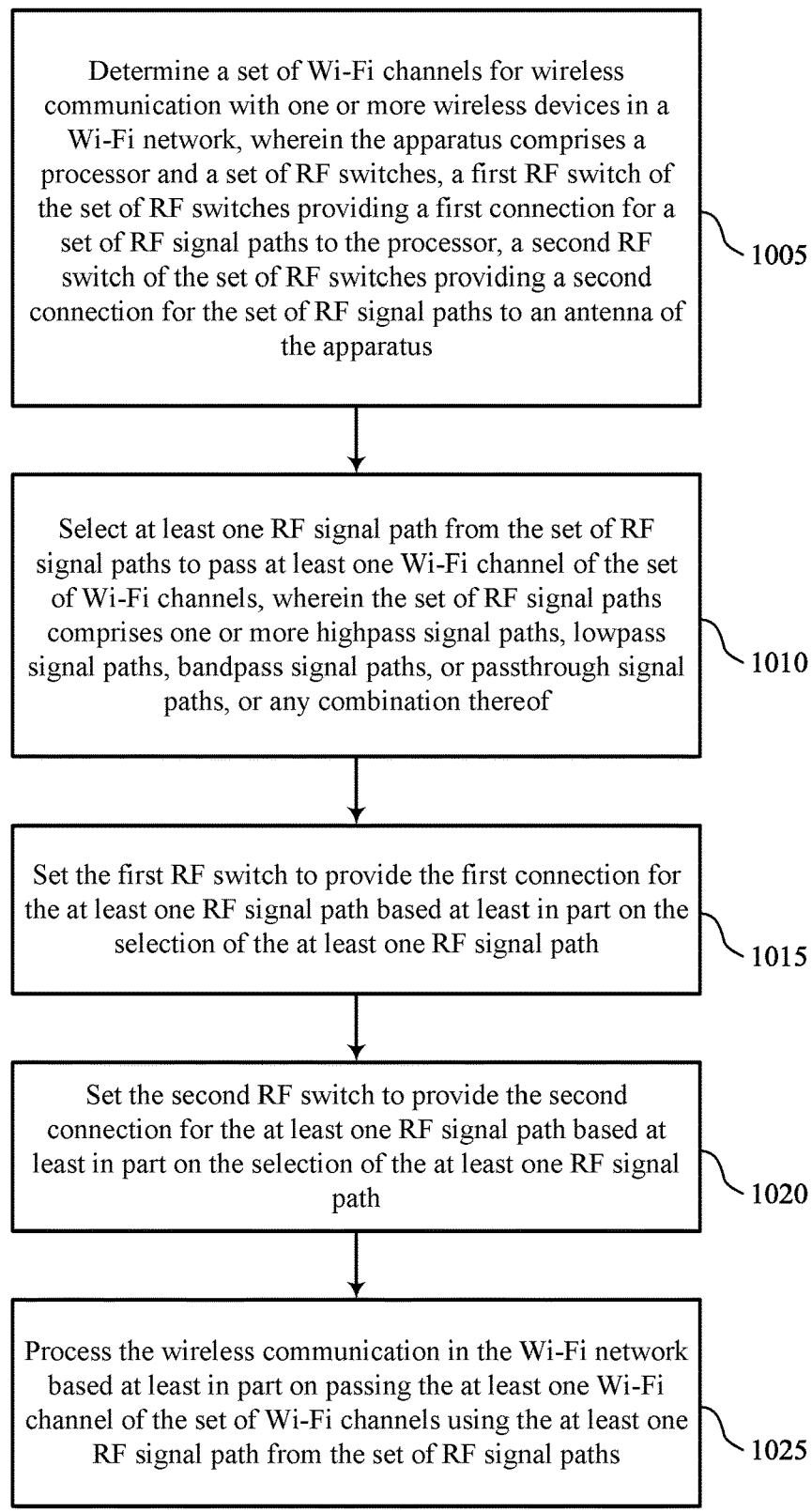

FIG. 10 shows a flowchart illustrating a method 1000 that supports Wi-Fi routers and switching in accordance with aspects of the present disclosure. The operations of the method 1000 may be implemented by an apparatus in a Wi-Fi network as described herein. For example, the operations of the method 1000 may be performed by a Wi-Fi device as described with reference to FIGS. 1 through 7. In some examples, a Wi-Fi device may execute a set of instructions to control the functional elements of the Wi-Fi device to perform the described functions. Additionally or alternatively, the Wi-Fi device may perform aspects of the described functions using special-purpose hardware.

At 1005, the method may include determining a set of Wi-Fi channels for wireless communication with one or more wireless devices in a Wi-Fi network, where the apparatus (e.g., the Wi-Fi device) includes a processor and a set of RF switches, a first RF switch of the set of RF switches providing a first connection for a set of RF signal paths to the processor, a second RF switch of the set of RF switches providing a second connection for the set of RF signal paths to an antenna of the apparatus. The operations of 1005 may be performed in accordance with examples as disclosed herein. In some examples, aspects of the operations of 1005 may be performed by a channel component 625 as described with reference to FIG. 6.

At 1010, the method may include selecting at least one RF signal path from the set of RF signal paths to pass at least one Wi-Fi channel of the set of Wi-Fi channels, where the set of RF signal paths includes one or more highpass signal paths, lowpass signal paths, bandpass signal paths, or pass-through signal paths, or any combination thereof. The operations of 1010 may be performed in accordance with examples as disclosed herein. In some examples, aspects of the operations of 1010 may be performed by a selection component 630 as described with reference to FIG. 6.

At 1015, the method may include setting the first RF switch to provide the first connection for the at least one RF signal path based on the selection of the at least one RF signal path. The operations of 1015 may be performed in accordance with examples as disclosed herein. In some examples, aspects of the operations of 1015 may be performed by a switch component 650 as described with reference to FIG. 6.

At 1020, the method may include setting the second RF switch to provide the second connection for the at least one RF signal path based on the selection of the at least one RF signal path. The operations of 1020 may be performed in accordance with examples as disclosed herein. In some examples, aspects of the operations of 1020 may be performed by a switch component 650 as described with reference to FIG. 6.

At 1025, the method may include processing the wireless communication in the Wi-Fi network based on passing the at least one Wi-Fi channel of the set of Wi-Fi channels using the at least one RF signal path from the set of RF signal paths. The operations of 1025 may be performed in accordance with examples as disclosed herein. In some examples, aspects of the operations of 1025 may be performed by a communication component 635 as described with reference to FIG. 6.

It should be noted that the methods described herein describe possible implementations, and that the operations and the steps may be rearranged or otherwise modified and that other implementations are possible. Further, aspects from two or more of the methods may be combined.

An apparatus is described. The apparatus may include a processor, memory coupled with the processor, a set of RF switches coupled to the processor, a first RF switch of the set of RF switches providing a first connection for a set of RF signal paths to the processor, and a second RF switch of the set of RF switches providing a second connection for the set of RF signal paths to an antenna of the apparatus, the set of RF signal paths comprising one or more highpass signal paths, lowpass signal paths, bandpass signal paths, or pass-through signal paths, or any combination thereof, and instructions stored in the memory and executable by the processor to cause the apparatus to determine a set of Wi-Fi channels for the wireless communication with one or more wireless devices in the Wi-Fi network, select at least one RF signal path from the set of RF signal paths to pass at least one Wi-Fi channel of the set of Wi-Fi channels, and process the wireless communication in the Wi-Fi network based at least in part on passing the at least one Wi-Fi channel of the set of Wi-Fi channels using the at least one RF signal path from the set of RF signal paths.

In some examples of the apparatus, the instructions to process the wireless communication may be further executable by the processor to receive the wireless communication from the one or more wireless devices and filter the wireless communication using a filter included in the at least one RF signal path.

In some examples of the apparatus, the instructions may be further executable by the processor to scan the set of Wi-Fi channels to determine a channel quality associated with each Wi-Fi channel of the set of Wi-Fi channels and where the instructions to select the at least one RF signal path may be further executable by the processor based at least in part on the scan.

In some examples of the apparatus, the instructions to select the at least one RF signal path may be further executable by the processor to select the at least one RF signal path based at least in part on a user setting to select the at least one RF signal path.

In some examples of the apparatus, the instructions may be further executable by the processor to set the first RF switch to provide the first connection for the at least one RF signal path based at least in part on the selection of the at least one RF signal path and set the second RF switch to provide the second connection for the at least one RF signal path based at least in part on the selection of the at least one RF signal path.

In some examples of the apparatus, the instructions may be further executable by the processor to cause the apparatus to select, based at least in part on a trigger, a second RF signal path from the set of RF signal paths to pass a second Wi-Fi channel of the set of Wi-Fi channels and process a second wireless communication in the Wi-Fi network based at least in part on passing the second Wi-Fi channel of the set of Wi-Fi channels using the second RF signal path from the set of RF signal paths.

In some examples of the apparatus, the instructions may be further executable by the processor to detect that a channel quality associated with the at least one Wi-Fi channel satisfies a threshold, where the trigger corresponds to the channel quality associated with the at least one Wi-Fi channel satisfying the threshold.

In some examples of the apparatus, the instructions may be further executable by the processor to enable a timer based at least in part on the channel quality associated with the at least one Wi-Fi channel satisfying the threshold, where the trigger corresponds to the timer lapsing.

In some examples of the apparatus, the instructions may be further executable by the processor to scan the set of Wi-Fi channels to determine a respective channel quality associated with each Wi-Fi channel of the set of Wi-Fi channels, where the threshold may be based at least in part on the respective channel qualities.

In some examples of the apparatus, the instructions may be further executable by the processor to determine a reset condition of the apparatus, where the trigger corresponds to the reset condition.

In some examples of the apparatus, the set of RF signal paths includes a set of filters, each filter of the set of filters corresponding to a RF signal path of the set of RF signal paths. In some examples, the apparatus may include one or more Wi-Fi radio chips coupled with the processor. In some examples of the apparatus, the set of Wi-Fi channels corresponds to a first RF spectrum band, each Wi-Fi channel corresponding to a RF spectrum subband of the first RF spectrum band. In some examples of the apparatus, the first RF spectrum band may be a 2.4 GHz band.

In some examples of the apparatus, the apparatus may be located within a threshold distance of a Wi-Fi device in the Wi-Fi network. In some examples of the apparatus, the one or more wireless devices may be camera-enabled devices. In some examples of the apparatus, the apparatus may be a Wi-Fi device associated with one or more of an automation system, a security system, or a home automation system.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller or another component described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some cases, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various cases have been described and/or illustrated here in the context of fully functional computing systems, one or more of these exemplary cases may be distributed as a program product in a variety of forms, regardless of the particular type of computer-readable media used to actually carry out the distribution. The cases disclosed herein may also be implemented using software modules that perform certain tasks. These software modules may include script, batch, or other executable files that may be stored on a computer-readable storage medium or in a computing system. In some cases, these software modules may permit and/or instruct a computing system to perform one or more of the exemplary cases disclosed here.

This description, for purposes of explanation, has been described with reference to specific cases. The illustrative discussions above, however, are not intended to be exhaustive or limit the present systems and methods to the precise forms discussed. Many modifications and variations are possible in view of the above teachings. The cases were chosen and described in order to explain the principles of the present systems and methods and their practical applications, to enable others skilled in the art to utilize the present systems, apparatus, and methods and various cases with various modifications as may be suited to the particular use contemplated.

What is claimed is:

1. An apparatus for wireless communication in a Wi-Fi network, comprising:
 a processor;
 memory coupled with the processor;
 a set of radio frequency switches coupled to the processor, a first radio frequency switch of the set of radio frequency switches providing a first connection for a set of radio frequency signal paths to the processor, and a second radio frequency switch of the set of radio frequency switches providing a second connection for the set of radio frequency signal paths to an antenna of the apparatus, the set of radio frequency signal paths comprising one or more highpass signal paths, lowpass signal paths, bandpass signal paths, or passthrough signal paths, or any combination thereof; and
 instructions stored in the memory and executable by the processor to cause the apparatus to:
  determine a set of Wi-Fi channels for the wireless communication with one or more wireless devices in the Wi-Fi network;
  select at least one radio frequency signal path from the set of radio frequency signal paths to pass at least one Wi-Fi channel of the set of Wi-Fi channels; and
  process the wireless communication in the Wi-Fi network based at least in part on passing the at least one Wi-Fi channel of the set of Wi-Fi channels using the at least one radio frequency signal path from the set of radio frequency signal paths.

2. The apparatus of claim 1, wherein the instructions to process the wireless communication are further executable by the processor to cause the apparatus to:
receive the wireless communication from the one or more wireless devices; and
filter the wireless communication using a filter included in the at least one radio frequency signal path.

3. The apparatus of claim 1, wherein the instructions are further executable by the processor to cause the apparatus to:
scan the set of Wi-Fi channels to determine a channel quality associated with each Wi-Fi channel of the set of Wi-Fi channels,
wherein the instructions to select the at least one radio frequency signal path are further executable by the processor based at least in part on the scan.

4. The apparatus of claim 1, wherein the instructions to select the at least one radio frequency signal path are further executable by the processor to cause the apparatus to:
select the at least one radio frequency signal path based at least in part on a user setting to select the at least one radio frequency signal path.

5. The apparatus of claim 1, wherein the instructions are further executable by the processor to cause the apparatus to:
set the first radio frequency switch to provide the first connection for the at least one radio frequency signal path based at least in part on the selection of the at least one radio frequency signal path; and
set the second radio frequency switch to provide the second connection for the at least one radio frequency signal path based at least in part on the selection of the at least one radio frequency signal path.

6. The apparatus of claim 1, wherein the instructions are further executable by the processor to cause the apparatus to:
select, based at least in part on a trigger, a second radio frequency signal path from the set of radio frequency signal paths to pass a second Wi-Fi channel of the set of Wi-Fi channels; and
process a second wireless communication in the Wi-Fi network based at least in part on passing the second Wi-Fi channel of the set of Wi-Fi channels using the second radio frequency signal path from the set of radio frequency signal paths.

7. The apparatus of claim 6, wherein the instructions are further executable by the processor to cause the apparatus to:
detect that a channel quality associated with the at least one Wi-Fi channel satisfies a threshold, wherein the trigger corresponds to the channel quality associated with the at least one Wi-Fi channel satisfying the threshold.

8. The apparatus of claim 7, wherein the instructions are further executable by the processor to cause the apparatus to:
enable a timer based at least in part on the channel quality associated with the at least one Wi-Fi channel satisfying the threshold, wherein the trigger corresponds to the timer lapsing.

9. The apparatus of claim 7, the instructions are further executable by the processor to cause the apparatus to:
scan the set of Wi-Fi channels to determine a respective channel quality associated with each Wi-Fi channel of the set of Wi-Fi channels, wherein the threshold is based at least in part on the respective channel qualities.

10. The apparatus of claim 6, wherein the instructions are further executable by the processor to cause the apparatus to:
determine a reset condition of the apparatus, wherein the trigger corresponds to the reset condition.

11. The apparatus of claim 1, wherein the set of radio frequency signal paths comprises a set of filters, each filter of the set of filters corresponding to a radio frequency signal path of the set of radio frequency signal paths.

12. The apparatus of claim 1, further comprising:
one or more Wi-Fi radio chips coupled with the processor.

13. The apparatus of claim 1, wherein the set of Wi-Fi channels corresponds to a first radio frequency spectrum band, each Wi-Fi channel corresponding to a radio frequency spectrum subband of the first radio frequency spectrum band.

14. The apparatus of claim 13, wherein the first radio frequency spectrum band is a 2.4 gigahertz band.

15. The apparatus of claim 1, wherein the apparatus is located within a threshold distance of a Wi-Fi device in the Wi-Fi network.

16. The apparatus of claim 1, wherein the one or more wireless devices are camera-enabled devices.

17. The apparatus of claim 1, wherein the apparatus is a Wi-Fi device associated with one or more of an automation system, a security system, or a home automation system.

18. A method for wireless communication at an apparatus in a Wi-Fi network, comprising:
determining a set of Wi-Fi channels for the wireless communication with one or more wireless devices in the Wi-Fi network, wherein the apparatus comprises a processor and a set of radio frequency switches, a first radio frequency switch of the set of radio frequency switches providing a first connection for a set of radio frequency signal paths to the processor, a second radio frequency switch of the set of radio frequency switches providing a second connection for the set of radio frequency signal paths to an antenna of the apparatus;
selecting at least one radio frequency signal path from the set of radio frequency signal paths to pass at least one Wi-Fi channel of the set of Wi-Fi channels, wherein the set of radio frequency signal paths comprises one or more highpass signal paths, lowpass signal paths, bandpass signal paths, or passthrough signal paths, or any combination thereof; and
processing the wireless communication in the Wi-Fi network based at least in part on passing the at least one Wi-Fi channel of the set of Wi-Fi channels using the at least one radio frequency signal path from the set of radio frequency signal paths.

19. The method of claim 18, wherein processing the wireless communication comprises:
receiving the wireless communication from the one or more wireless devices; and
filtering the wireless communication using a filter included in the at least one radio frequency signal path.

20. A computer program product comprising a non-transitory computer readable storage medium having program code embodied therein, the program code readable/executable by a processor to:
determine a set of Wi-Fi channels for the wireless communication with one or more wireless devices in the Wi-Fi network, wherein the apparatus comprises a processor and a set of radio frequency switches, a first radio frequency switch of the set of radio frequency switches providing a first connection for a set of radio frequency signal paths to the processor, a second radio frequency switch of the set of radio frequency switches providing a second connection for the set of radio frequency signal paths to an antenna of the apparatus;

select at least one radio frequency signal path from the set of radio frequency signal paths to pass at least one Wi-Fi channel of the set of Wi-Fi channels, wherein the set of radio frequency signal paths comprises one or more highpass signal paths, lowpass signal paths, bandpass signal paths, or passthrough signal paths, or any combination thereof; and process the wireless communication in the Wi-Fi network based at least in part on passing the at least one Wi-Fi channel of the set of Wi-Fi channels using the at least one radio frequency signal path from the set of radio frequency signal paths.

\* \* \* \* \*